United States Patent
Saarinen

(10) Patent No.: US 12,474,891 B2
(45) Date of Patent: Nov. 18, 2025

(54) CRYPTOGRAPHIC ARCHITECTURE FOR CRYPTOGRAPHIC PERMUTATION

(71) Applicant: PQShield Ltd, Oxford (GB)

(72) Inventor: Markku-Juhani Olavi Saarinen, Oxford (GB)

(73) Assignee: PQShield Ltd, Oxford (GB)

(*) Notice: Subject to any disclaimer, the term of this patent is extended or adjusted under 35 U.S.C. 154(b) by 129 days.

(21) Appl. No.: 17/576,299

(22) Filed: Jan. 14, 2022

(65) Prior Publication Data

US 2022/0138349 A1 May 5, 2022

Related U.S. Application Data

(63) Continuation of application No. PCT/GB2020/051699, filed on Jul. 15, 2020.

(30) Foreign Application Priority Data

Jul. 19, 2019 (GB) ........................................ 1910372

(51) Int. Cl.
G06F 21/60 (2013.01)
G06F 7/58 (2006.01)
(Continued)

(52) U.S. Cl.
CPC .............. *G06F 7/584* (2013.01); *G06F 7/768* (2013.01); *G06F 9/30029* (2013.01);
(Continued)

(58) Field of Classification Search
None
See application file for complete search history.

(56) References Cited

U.S. PATENT DOCUMENTS

| 3,911,330 A | 10/1975 | Fletcher et al. |
| 4,589,120 A * | 5/1986 | Mendala ................. H04L 7/044 375/369 |

(Continued)

FOREIGN PATENT DOCUMENTS

| CN | 103812643 A | 5/2014 |
| CN | 107800532 A | 3/2018 |

(Continued)

OTHER PUBLICATIONS

Liang, W. and Long Jing: "A cryptographic algorithm based on Linear Feedback Shift Register." 2010 International Conference on Computer Application and System Modeling (ICCASM 2010). vol. 15. IEEE, 2010. (Year: 2010).

(Continued)

*Primary Examiner* — Lance Leonard Barry
(74) *Attorney, Agent, or Firm* — EIP US LLP

(57) ABSTRACT

Cryptographic methods and systems are described. Certain examples relate to performing cryptographic operations that involve a cryptographic permutation. The methods and systems may be used to provide cryptographic functions such as hashing, encryption, decryption and random number generation. In one example, a cryptographic architecture is provided. The cryptographic architecture has a processor interface comprising a set of cryptographic registers, where the processor interface is accessible by at least one processing unit. The cryptographic architecture also has a cryptographic permutation unit comprising circuitry to perform a cryptographic permutation using data stored within the set of cryptographic registers. In examples, the at least one processing unit instructs the cryptographic permutation and accesses a result of the cryptographic permutation using the processor interface.

15 Claims, 7 Drawing Sheets

(51) Int. Cl.
*G06F 7/76* (2006.01)
*G06F 9/30* (2018.01)
*G06F 21/72* (2013.01)
*H04L 9/06* (2006.01)

(52) U.S. Cl.
CPC ........ *G06F 9/30032* (2013.01); *G06F 21/602* (2013.01); *G06F 21/72* (2013.01); *H04L 9/0631* (2013.01); *H04L 9/0643* (2013.01); *H04L 2209/12* (2013.01)

(56) References Cited

U.S. PATENT DOCUMENTS

| | | | |
|---|---|---|---|
| 5,764,765 | A | 6/1998 | Phoenix |
| 6,407,766 | B1 | 6/2002 | Ramanujan |
| 6,748,083 | B2 | 6/2004 | Hughes |
| 7,437,081 | B2 | 10/2008 | Howell |
| 8,194,855 | B2 | 6/2012 | Shantz et al. |
| 8,538,012 | B2 | 9/2013 | Dixon et al. |
| 8,572,410 | B1* | 10/2013 | Tkacik .................. H04L 9/0861 713/192 |
| 8,761,401 | B2 | 6/2014 | Sprunk |
| 8,782,774 | B1 | 7/2014 | Pahl |
| 8,855,316 | B2 | 10/2014 | Wiseman |
| 9,628,268 | B2 | 4/2017 | Kiang |
| 9,772,845 | B2 | 9/2017 | Yap et al. |
| 9,960,465 | B2 | 5/2018 | Dudley |
| 10,038,550 | B2 | 7/2018 | Gopal et al. |
| 10,057,058 | B2 | 8/2018 | Murakami |
| 10,313,129 | B2* | 6/2019 | Gopal ................. G06F 9/30007 |
| 2002/0040429 | A1 | 4/2002 | Dowling |
| 2003/0084309 | A1 | 5/2003 | Khon |
| 2005/0138352 | A1 | 6/2005 | Gauvreau |
| 2007/0065154 | A1 | 3/2007 | Luo |
| 2007/0076884 | A1 | 4/2007 | Wellbrock |
| 2007/0195774 | A1 | 8/2007 | Sherman |
| 2008/0019524 | A1 | 1/2008 | Kim et al. |
| 2008/0056488 | A1* | 3/2008 | Motoyama ................ G06F 7/00 380/28 |
| 2008/0229116 | A1 | 9/2008 | Dixon et al. |
| 2008/0298583 | A1* | 12/2008 | Ahmed ................... H04L 9/065 380/46 |
| 2009/0254718 | A1 | 10/2009 | Biscondi et al. |
| 2010/0115237 | A1 | 5/2010 | Brewer et al. |
| 2010/0128872 | A1 | 5/2010 | Cordery et al. |
| 2010/0146296 | A1 | 6/2010 | Kim et al. |
| 2010/0195820 | A1* | 8/2010 | Frank ................... H04L 9/0631 380/28 |
| 2010/0235417 | A1 | 9/2010 | Baek |
| 2010/0289943 | A1* | 11/2010 | Tokoro ................... H04H 40/27 348/425.2 |
| 2011/0206204 | A1 | 8/2011 | Sychev |
| 2011/0213979 | A1 | 9/2011 | Wiseman |
| 2012/0076293 | A1 | 3/2012 | Smith et al. |
| 2013/0275722 | A1 | 10/2013 | Yap et al. |
| 2014/0010234 | A1 | 1/2014 | Patel |
| 2014/0068765 | A1 | 3/2014 | Choi |
| 2014/0095844 | A1 | 4/2014 | Gopal et al. |
| 2014/0133652 | A1 | 5/2014 | Oshida |
| 2014/0189369 | A1 | 7/2014 | Woolrich et al. |
| 2014/0254792 | A1 | 9/2014 | Gammel |
| 2015/0149788 | A1* | 5/2015 | Gupta .................. G06F 12/1408 713/189 |
| 2016/0080143 | A1 | 3/2016 | Kindarji et al. |
| 2016/0241396 | A1 | 8/2016 | Fu |
| 2016/0359626 | A1 | 12/2016 | Fu |
| 2016/0366094 | A1 | 12/2016 | Mason |
| 2017/0109162 | A1 | 4/2017 | Yap et al. |
| 2017/0142081 | A1* | 5/2017 | Jutla .................. H04L 63/061 |
| 2017/0180131 | A1* | 6/2017 | Ghosh ................... G06F 21/75 |
| 2017/0214525 | A1 | 7/2017 | Zhao |
| 2017/0230173 | A1 | 8/2017 | Choi |
| 2017/0242590 | A1* | 8/2017 | Gokhale ............. G06F 12/0223 |
| 2018/0063100 | A1 | 3/2018 | Peeters et al. |
| 2018/0157489 | A1* | 6/2018 | Yap ..................... G06F 9/30145 |
| 2018/0176091 | A1 | 6/2018 | Yoon |
| 2018/0212761 | A1 | 7/2018 | Bilgin et al. |
| 2019/0036821 | A1 | 1/2019 | Levy |
| 2019/0109703 | A1 | 4/2019 | Gueron et al. |
| 2019/0146700 | A1* | 5/2019 | Gschwind ........... G06F 9/30043 711/170 |
| 2019/0349392 | A1 | 11/2019 | Wetterwald |
| 2020/0084222 | A1 | 3/2020 | William |

FOREIGN PATENT DOCUMENTS

| | | | |
|---|---|---|---|
| EP | 0801477 | A1 * | 10/1997 |
| EP | 0955590 | A1 * | 11/1999 |
| EP | 0992887 | A2 * | 4/2000 |
| EP | 1068565 | A2 | 1/2001 |
| JP | H03251890 | A | 11/1991 |
| JP | H0697930 | A | 4/1994 |
| JP | 20010195555 | A | 7/2001 |
| JP | 2002107691 | A | 4/2002 |
| JP | 20050532604 | A | 10/2005 |
| JP | 2008233683 | A | 10/2008 |
| JP | 2014197169 | A | 10/2014 |
| JP | 2015014962 | A | 1/2015 |
| JP | H10-31530 | A | 2/2019 |
| JP | 20190511791 | A | 4/2019 |
| KR | 1020190020988 | A | 3/2019 |
| WO | 0176129 | A2 | 10/2001 |
| WO | 03/021863 | A1 | 3/2003 |
| WO | 2011123575 | A1 | 10/2011 |
| WO | 2014/136594 | A1 | 9/2014 |
| WO | WO-2019158641 | A1 * | 8/2019 ............ H04L 9/002 |

OTHER PUBLICATIONS

International Search Report and Written Opinion dated Nov. 7, 2022 for PCT Application No. PCT/GB2022/051829.

Peter Schwabe and Ko Stoffelen. All the AES you need on cortex-m3 and M4.In Roberto Avanzi and Howard M. Heys, editors, Selected Areas in Cryptog-raphy—SAC 2016—23rd International Conference, St. John's, NL, Canada,Aug. 10-12, 2016, Revised Selected Papers, vol. 10532 of Lecture Notes inComputer Science, pp. 180-194. Springer, 2016. URL: https://doi.org/10.1007/978-3-319-69453-5_10, doi:10.1007/978-3-319-69453-5\_10.

Ascon Lightweight Authenticated Encryption and Hashing, Jan. 2, 2019.

David J. Wheeler and Roger M. Needham. Correction to xtea. InformalManuscript or Report, 1998. URL: https://www.mjos.fi/doc/misc/xxtea.pdf. Oct. 1998.

"Blitter Hardware" of the Amiga Hardware Reference Manual. Addison-Wesley. 1985, Chapter 6.

""Crypto-processeur"", pp. 1-190 URL: https://tel.archives-ouvertes.fr/tel-00978472/document sections 3 and 4, 2012.

[CC-PP-0084] "Security IC Platform Protection Profile with Augmentation Packages." Bundesamt für Sicherheit in der Informationstechnik (BSI) reference BSI-CC-PP-0084-2014.https://www.commoncriteriaportal.org/files/ppfiles/pp0084b_pdf.pdf Jan. 13, 2014.

[Sogis-Ava] "Application of Attack Potential to Smartcards and Similar Devices." Version 3.1. (2020). https://www.sogis.eu/documents/cc/domains/sc/JIL-Application-of-Attack-Potential-to-Smartcards-v3-1.pdf Jun. 2020.

[SP800-193] "Platform Firmware Resiliency Guidelines." NIST SP 800-193. (2018). DOI: https://doi.org/10.6028/NIST.SP.800-193 May 2018.

[RFC8391] "XMSS: extended Merkle Signature Scheme." IETF RFC 8391 (2018). DOI: https://doi.org/10.17487/RFC8391 May 2018.

[RFC8554] "Leighton-Micali Hash-Based Signatures." IETF RFC 8554 (2018). DOI: https://doi.org/10.17487/RFC8554, Apr. 2018.

[FIPS202] "SHA-3 Standard: Permutation-Based Hash and Extendable-Output Functions." FIPS Pub 202. (2015). DOI: https://doi.org/10.6028/NIST.FIPS.202 Aug. 2015.

(56) References Cited

OTHER PUBLICATIONS

[PQFAQ] ""Post-Quantum Cryptography FAQs / Transition and Migration."" https://csrc.nist.gov/projects/post-quantum-cryptography/faqs Jan. 3, 2017.

[CoGrVa14] J. Coron, J. Großschadl, P. K. Vadnala. ""Secure Conversion Between Boolean and Arithmetic Masking of Any Order."" IACR-CHES (2014). http://www.crypto-uni.lu/jscoron/publications/secconvorder.pdf Sep. 23, 2014.

[Co17] J. Coron. "High-Order Conversion From Boolean to Arithmetic Masking." IACR-CHES (2017). https://eprint.iacr.org/2017/252 Sep. 25, 2017.

[GaGrMa+20] S. Gao, J. Großschädl, B. Marshall, D. Page, T. Pham, and F. Regazzoni."An Instruction Set Extension o Support Software-Based Masking." (2020) https://eprint.iacr.org/2020/773 Jun. 23, 2020.

[BeDaPe+10] G. Bertoni, J. Daemen, M. Peeters, and G. Van Assche. ""Building power analysis resistant Implementations of Keccak."" SHA-3 Conference (2010) https://keccak.team/files/KeccakDPA.pdf Aug. 2010.

[NiRiSc11] S. Nikova, V. Rijmen, and M. Schlaffer. ""Secure Hardware Implementation of Nonlinear Functions in the Presence of Glitches."" J. Cryptol. 24, pp. 292-322 (2011). https://doi.org/10.1007/s00145-010-9085-7 Oct. 19, 2010.

[Sa18] M.-J. O. Saarinen. "Arithmetic Coding and Blinding Countermeasures for Lattice Signatures." J. Cryptogr. Eng. (2018) 8:71-84. http://rdcu.be/oHun https://eprint.iacr.org/2016/276 Jan. 21, 2017.

[BaBeEs+18] G. Barthe, S. Belaïd, T. Espitau, P.-A. Fouque, B. Grégoire, M. Rossi, and M. Tibouchi. "Masking the GLP Lattice-Based Signature Scheme at Any Order." IACR-Eurocrypt (2018) https://eprint.iacr.org/2018/381 Apr. 26, 2018.

[BeAnKa+20] M. Van Beirendonck, J. D'Anvers, A. Karmakar, J. Balasch, and I. Verbauwhede."A Side-Channel Resistant Implementation of Saber." To appear in ACM JETC (2020). https://eprint.iacr.org/2020/733 Jun. 17, 2020.

[BoGoRe+21] J. Bos, M. Gourjon, J. Renes, T. Schneider, and C. van Vredendaal. "Masking Kyber: First- and Higher-Order Implementations." To appear (2021). https://eprint.iacr.org/2021/483 Apr. 15, 2021.

[FrVaRo+21] T. Fritzmann, M. Van Beirendonck, D. Basu Roy, P. Karl, T. Schamberger, I. Verbauwhede, and G. Sigl. "Masked Accelerators and Instruction Set Extensions for Post-Quantum Cryptography." Preprint (2021). https://eprint.acr.org/2021/479 Apr. 15, 2021.

[MiGeTi+19] V. Migliore, B. Gérard, M. Tibouchi, and P. Fouque. "Masking Dilithium: Efficient Implementation and Side-Channel Evaluation." ACNS (2019). https://eprint.iacr.org/2019/394 Apr. 14, 2019.

[RV-ISA] RISC-V International. "RISC-V Specifications." RISC-V International (2021). https://riscv.org/technical/specifications/.

[RV-Crypto] RISC-V International (Ben Marshall, Ed.) "RISC-V Cryptography Extension." RISC-V CETG (2021). https://github.com/riscv/riscv-crypto Feb. 19, 2020.

[RV-ZKT] RISC-V International (M.-J. Saarinen, Ed.) "ZKT Constant Time Instruction List." RISC-V CTEG (2021). https://github.com/rvkrypto/riscv-zkt-list Apr. 9, 2021.

[RV-Vector] Working draft of the proposed RISC-V V vector extension. RISC-V (2021). https://github.com/riscv/riscv-v-spec Jun. 13, 2019.

[SP 800-185] "SHA-3 Derived Functions: cShake, KMAC, TupleHash, and ParallelHash" National Institute of Standards and Technology (NIST), Dec. 2016 https://doi.org/10.6028/NIST.SP.800-185 John Kelsey, Shu-Jen Chang, Ray Perlner.

[NIST PQC] "Post-Quantum Cryptography: Round 2 Submissions" Jan. 3, 2017 https://csrc.nist.gov/Projects/Post-Quantum-Cryptography/Round-2-Submissions.

[NIST LWC] "Lightweight Cryptography: Round 1 Candidates" created Jan. 3, 2017 https://csrc.nist.gov/Projects/Lightweight-Cryptography/Round-1-Candidates.

[ASCON] Christoph Dobraunig, Maria Eichlseder, Florian Mendel and Martin Schlaffer, ""Asconv1.2."" Proposal to NIST LWC standardization effort, Mar. 2019. https://ascon.iaik.tugraz.at/files/asconv12-nist.pdf https://ascon.iaik.tugraz.at/.

[Farfalle] Guido Bertoni, Joan Daemen, Seth Hoffert, Michaël Peeters, Gilles Van Assche, and Ronny Van Keer, "Farfalle: parallel permutation-based cryptography." IACR Cryptology ePrintArchive: Report 2016/1188, Dec. 2016. https://eprint.iacr.org/2016/1188.

[Kangaroo] Guido Bertoni, Joan Daemen, Michaël Peeters, Gilles Van Assche, Ronny Van Keer, and Benoît Viguier, "KangarooTwelve: fast hashing based on Keccak-p." Proc. ACNS 2018,LNCS 10892, pp. 400-418, Springer, 2018. https://doi.org/10.1007/978-3-319-93387-0_21https://keccak.team/files/KangarooTwelve.pdf.

[Keyak] Guido Bertoni, Joan Daemen, Seth Hoffert, Michael Peeters, Gilles Van Assche, andRonny Van Keer, "Caesar submission: Keyak v2." Keccak Team, Sep. 2016.https://keccak.team/keyak.html https://keccak.team/files/Keyakv2-doc2.2.pdf.

[RISCV] Andrew Waterman and Krste Asanović (Eds.), "The RISC-V Instruction Set Manual(vols. 1 and 2)." RISC-V Foundation, Jun. 2019. https://riscv.org/specifications/.

[Sneik] Markku-Juhani O. Saarinen, "Sneiken and Sneikha: The Sneik Family of Lightweight Cryptographic Algorithms." Proposal to NIST LWC standardization effort, Mar. 2019. https://github.com/pqshield/sneik.

Hayo Baan, Sauvik Bhattacharya, Scott Fluhrer, Oscar Garcia-Morchon, ThijsLaarhoven, Ronald Rietman, Markku-Juhani O. Saarinen, Ludo Tolhuizen,and Zhenfei Zhang. Round5: Compact and fast post-quantum public-keyencryption. In PQCrypto 2019—The Tenth International Conference on Post-Quantum Cryptography. Chongqing, China, May 8-10, 2019, volume to appearof Lecture Notes in Computer Science. Springer, 2019. URL: https://eprint.iacr.org/2019/090.

Daniel J. Bernstein. Chacha, a variant of salsa20, 2008. URL: https://cr.yp.to/chacha/chacha-20080128.pdf. Jan. 28, 2008.

Joppe W. Bos, Simon Friedberger, Marco Martinoli, Elisabeth Oswald, andMartijn Stam. Fly, you fool! faster frodo for the ARM cortex-m4. IACRCryptology ePrint Archive, 2018:1116, 2018. URL: https://eprint.iacr.org/2018/1116. Nov. 16, 2018.

Daniel J. Bernstein et al : A cross-platformpermutation. In Wieland Fischer and Naofumi Homma, editors, Crypto-graphic Hardware and Embedded Systems—Ches 2017—19th InternationalConference, Taipei, Taiwan, Sep. 25-28, 2017, Proceedings, vol. 10529 of Lecture Notes in Computer Science, pp. 299-320. Springer, 2017. doi:10.1007/978-3-319-66787-4\_15. Sep. 25, 2017.

Ray Beaulieu, Douglas Shors, Jason Smith, Stefan Treatman-Clark, BryanWeeks, and Louis Wingers. The Simon and Speck families of lightweightblock ciphers. IACR Cryptology ePrint Archive, 2013:404, 2013. URL: https://eprint.iacr.org/2013/404. Jun. 19, 2013.

Christoph Dobraunig, Maria Eichlseder, Florian Mendel, and Martin Schläffer.Ascon v1.2. Submission to the Caesar Competition, 2016. URL: https://competitions.cr.yp.to/round3/asconv12.pdf. Sep. 15, 2016.

Joan Daemen, Seth Hoffert, Gilles Van Assche, and Ronny Van Keer. Thedesign of xoodoo and xoofff. IACR Trans. Symmetric Cryptol., 2018(4):1-38, 2018. URL: https://doi.org/10.13154/tosc.v2018.i4.1-38, doi:10.13154/tosc.v2018.4.1-38. Dec. 13, 2018.

Peter Gazi et al. The exact PRF security of truncation: Tight bounds for keyed sponges and truncated CBC. In Rosario Gennaro and Matthew Robshaw, editors, Advances in Cryptology—CRYPTO2015—35th Annual Cryptology Conference, Santa Barbara, CA, USA, Aug. 16-20, 2015, Proceedings, Part I, vol. 9215 of Lecture Notes in ComputerScience, pp. 368-387. Springer, 2015. doi:10.1007/978-3-662-47989-6\_18. Aug. 16, 2015.

Mike Hamburg. The Strobe protocol framework. IACR Cryptology ePrintArchive, 2017:3, 2017. URL: http://eprint.iacr.org/2017/003. Jan. 3, 2017.

Philipp Jovanovic et al. Beyond 2 c/2 security insponge-based authenticated encryption modes. In Palash Sarkar and Tetsulwata, editors, Advances in Cryptology—Asiacrypt 2014—20th International Conference on the Theory and Application of Cryptology and Informa-tion Security, Kaoshiung, Taiwan, R.O.C., Dec. 7-11, 2014. Proceedings, Part I, vol. 8873 of Lecture Notes in Computer Science, pp. 85-104.Springer, 2014. doi:10.1007/978-3-662-45611-8\_5.

(56) References Cited

OTHER PUBLICATIONS

Dmitry Khovratovich and Ivica Nikolic. Rotational cryptanalysis of ARX. InSeokhie Hong and Tetsu Iwata, editors, Fast Software Encryption, 17th In-ternational Workshop, FSE 2010, Seoul, Korea, Feb. 7-10, 2010, RevisedSelected Papers, vol. 6147 of Lecture Notes in Computer Science, pp. 333-346. Springer, 2010. URL: https://doi.org/10.1007/978-3-642-13858-4_19, doi:10.1007/978-3-642-13858-4\_19.

Kathleen M. Moriarty, Burt Kaliski, Jakob Jonsson, and Andreas Rusch.PKCS #1: RSA cryptography specifications version 2.2. RFC, 8017:1-78,2016. doi:10.17487/RFC8017. Nov. 2016.

Bart Mennink, Reza Reyhanitabar, and Damian Vizár. Security of full-statekeyed sponge and duplex: Applications to authenticated encryption. In TetsuIwata and Jung Hee Cheon, editors, Advances in Cryptology—Asiacrypt2015—21st International Conference on the Theory and Application of Cryptol-ogy and Information Security, Auckland, New Zealand, Nov. 29-Dec. 3, 2015, Proceedings, Part II, vol. 9453 of Lecture Notes in ComputerScience, pp. 465-489. Springer, 2015. doi:10.1007/978-3-662-48800-3\_19.

B. Poettering. Avraes: The aes block cipher on avr controllers, 2007. URL:http://point-at-infinity.org/avraes/. Mar. 11, 2007.

Markku-Juhani O. Saarinen. Beyond modes: Building a secure record protocol from a cryptographic sponge permutation. In Benaloh [Ben14], pp. 270-285.doi:10.1007/978-3-319-04852-9\_14. Feb. 25, 2014.

Markku-Juhani O. Saarinen. CBeam: efficient authenticated encryption fromfeebly one-way φ functions. In Benaloh [Ben14], pp. 251-269. doi:10.1007/978-3-319-04852-9\_13. Nov. 21, 2013.

Markku-Juhani O. Saarinen and Billy Bob Brumley. Whirlbob, the whirlpoolbased variant of Stribob. In Sonja Buchegger and Mads Dam, editors, Se-cure IT Systems, 20th Nordic Conference, NordSec 2015, Stockholm, Sweden, Oct. 19-21, 2015, Proceedings, vol. 9417 of Lecture Notes in ComputerScience, pp. 106-122. Springer, 2015. doi: 10.1007/978-3-319-26502-51_8.

Japanese Office Action dated Jul. 1, 2024 for Japanese Patent Application No. 2022-503796.

Notice of Allowance dated Aug. 5, 2025 for Chinese Patent Application No. 2020800583418.

Notice of Allowance dated Jun. 30, 2025 for U.S. Appl. No. 18/412,267.

* cited by examiner ized within everyday objects such as motor vehicles, lightbulbs, fridges, medical devices, thermostats and surveillance systems. Telecommunications links allow
CRYPTOGRAPHIC ARCHITECTURE FOR CRYPTOGRAPHIC PERMUTATION

CROSS-REFERENCE TO RELATED APPLICATIONS

This application is a continuation of International Application No. PCT/GB2020/051699, filed Jul. 15, 2020, which claims priority to GB Application No. GB 1910372.0, filed Jul. 19, 2019, under 35 U.S.C. § 119(a). Each of the above-referenced patent applications is incorporated by reference in its entirety.

BACKGROUND

Technical Field

The present invention relates to a cryptographic architecture and methods of performing a cryptographic operation. In particular, the present invention relates to cryptographic operations involving a cryptographic permutation. Certain examples described herein may be used within computing devices to perform cryptographic operations.

BACKGROUND

Recently, there has been an explosion in the number of devices that are connected to computer networks. For example, Internet connectivity is expanding beyond computing devices such as desktop and laptop computers to embedded systems within everyday objects such as motor vehicles, lightbulbs, fridges, medical devices, thermostats and surveillance systems. Telecommunications links allow many low-cost computing devices to report sensor data, and/or be controlled, across the world. One issue with these connected devices is that they are often vulnerable to attack and malicious control. For example, hundreds or thousands of embedded devices may be compromised by malicious parties and used to enact distributed denial of services attacks. In many cases, control of these devices is easily obtained due to poor or limited implementations of cryptographic protocols. As these connected devices grow in number and popularity, there is an open question as to how to secure them.

Another consideration when securing connected computing devices is the possibility of a future attack using quantum computing. For many years, quantum computers were of mainly theoretical interest. However, research implementations of quantum computers are developing rapidly. Quantum computers having 50 and 72 qubits are currently available, and there are many research groups actively working on higher qubit machines. Given the possible future reality of quantum computing, recent work has shown that many well-known public key cryptographic systems can be broken by a sufficiently strong quantum computer.

When implementing cryptographic functions, especially those that are "post quantum" secure, there is the challenge that many of these functions are resource intensive. For example, many cryptographic functions involve complex mathematical functions using values with long bit lengths. These typically consume a large number of processor cycles and present difficulties for implementations within low-resource embedded devices. Additionally, as end-to-end encryption of both data and communications becomes common, these cryptographic functions also have to be performed repeatedly at high speeds. To be secure is to be slow.

U.S. Pat. No. 9,772,845 B2 describes an apparatus to process the KECCAK secure hashing algorithm. In the apparatus of U.S. Pat. No. 9,772,845 B2, an instruction decoder receives an instruction to process a KECCAK state cube of data representing a KECCAK state of a KECCAK hash algorithm. The instruction instructs the partition of the KECCAK state cube into a plurality of subcubes, and the storage of the subcubes in a plurality of registers, respectively. An execution unit coupled to the instruction decoder performs the KECCAK hash algorithm on the plurality of subcubes respectively stored in the plurality of registers in a vector manner. The apparatus of U.S. Pat. No. 9,772,845 B2 is a processor such as a Complex Instruction Set Computing (CISC) or Reduced Instruction Set Computing (RISC) processor. The methods described in U.S. Pat. No. 9,772,845 B2 are implemented by the processor. The methods may be implemented with eight instructions per round of the KECCAK algorithm, where each round is performed on a slice (the subcube) of the total data.

It is desirable to provide efficient implementations of cryptographic operations. For example, it is desired to provide implementations that may be used within low-resource embedded systems and/or in high-speed data processing operations, while offering resistance to attack in a post-quantum environment.

SUMMARY

Aspects of the present invention are set out in the appended independent claims. Certain variations of the invention are then set out in the appended dependent claims.

BRIEF DESCRIPTION OF THE DRAWINGS

Examples of the invention will now be described, by way of example only, with reference to the accompanying drawings, in which.

DETAILED DESCRIPTION

Certain examples described herein provide a cryptographic architecture that allows a processing unit to efficiently perform a cryptographic permutation. The cryptographic architecture provides a processor interface that enables the processing unit to effectively communicate with a cryptographic permutation unit to perform a cryptographic permutation. As such, the processing unit may effectively off-load computation of the permutation to a dedicated module and then access the results of the permutation via the processor interface. The cryptographic architecture may provide atomic low-level operations that allow many advanced cryptographic functions to be rapidly computed, including those that are "post-quantum" secure. The cryptographic architecture may perform rapid cryptographic base functions on behalf of a processor or microprocessor, and as such provides benefits for both low-power embedded devices and high-throughput server devices.

Figure 1:
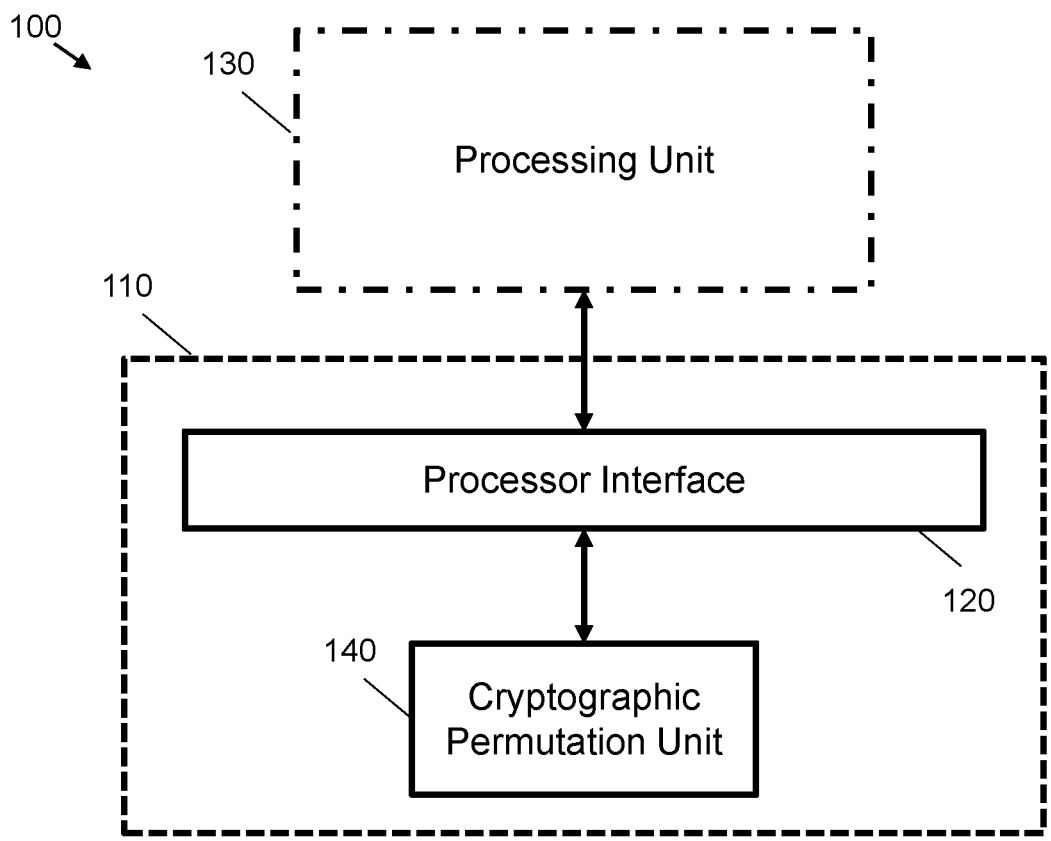
FIG. 1 is a schematic illustration showing a cryptographic architecture according to an example.

FIG. 1 shows an example 100 of a cryptographic architecture 110. In FIG. 1, the cryptographic architecture 110 comprises a processor interface 120 that enables the cryptographic architecture 110 to communicate with a processing unit 130. The processing unit 130 is shown with a dot-dash outline as it may not form part of the cryptographic architecture 110. The cryptographic architecture 110 also comprises a cryptographic permutation unit 140. The cryptographic permutation unit 140 comprises circuitry to perform a cryptographic permutation. As shown in FIG. 1, in use, the processing unit 130 instructs the cryptographic permutation and accesses a result of the cryptographic permutation using the processor interface 120.

In one example, the processor interface 120 comprises a set of cryptographic registers. The cryptographic registers may be accessible to the processing unit 130, e.g. certain cryptographic registers may be readable and/or writable by the processing unit 130. In use, the processing unit 130 may access a result of the cryptographic permutation, as performed by the cryptographic permutation unit 140, via the set of cryptographic registers, i.e. using data stored within the set of cryptographic registers. The set of cryptographic registers may be used for exchanging data and control information between the cryptographic permutation unit 140 and the processing unit 130. The cryptographic registers may be accessed one or more of memory mapped registers and as a part of named Single Instruction, Multiple Data (SIMD) or vector register set of the processing unit 130.

In certain examples, the processing unit 130 comprises a microprocessor having one or more processing cores, e.g. the processing unit 130 may be a processing unit for an embedded device. In other examples, the processing unit may comprise a central processing unit of a computing device that has one or more processing cores, e.g. the processing unit 130 may be a processing unit for mobile computing device, desktop computer and/or server computing device.

The cryptographic architecture 110 may be implemented in a number of different ways (and combinations of approaches are possible). In one case, the cryptographic architecture 110 may be implemented using one or more Application Specific Integrated Circuits (ASICs). In another case, the cryptographic architecture 110 may be implemented using one or more Field Programmable Gate Arrays (FPGAs). In yet another case, the cryptographic architecture 110 may be implemented using firmware for the processing unit 130. In certain cases, different components of the cryptographic architecture 110 may be implemented using a combination of two or more of ASICs, FPGAs and firmware instructions. In one case, the functionality of the cryptographic architecture 110 may be provided via one or more of a microcode and firmware update. In this case, authentication of the code may be required to ensure security. The cryptographic permutation unit 140 may be implemented in a similar manner.

In an example, one or more of the cryptographic architecture 110 and the cryptographic permutation unit 140 may be provided (e.g. packaged) as a discrete unit. For example, the discrete unit may be a self-contained security microcontroller (e.g. supplied as a smart card, a Universal Serial Bus—USB—device and/or a Radio Frequency Identification—RFID—device), a cryptographic coprocessor or accelerator, a cryptographic Trusted Platform Module (TPM) or a Hardware Security Module (HSM). The discrete unit may be coupled to the processing unit 130 via one or more communications buses or interfaces and/or co-located on a circuit board. Hence, the cryptographic architecture 110 may be provided as a single chip that is easily added to a computing board for a wide variety of computing devices.

Figure 2:
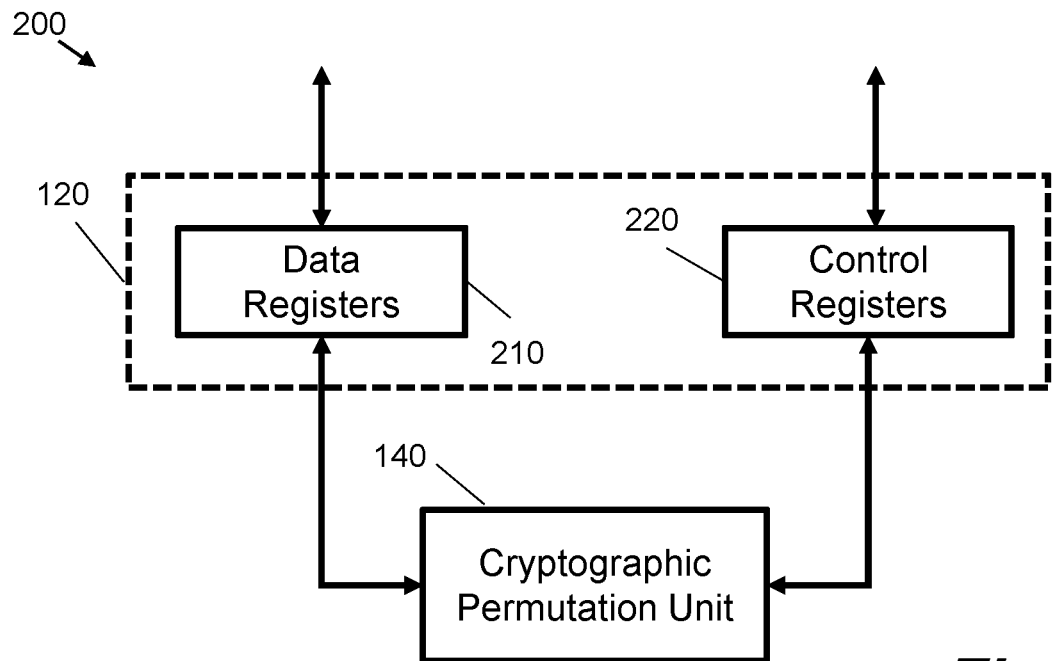
FIG. 2 is a schematic illustration showing registers of a processor interface according to an example.

FIG. 2 shows a processor interface 120 where the cryptographic registers comprise a first set of data registers 210 and a second set of control registers 220. The cryptographic permutation unit 140 is able to read and/or write data to both sets of registers 210, 220. Likewise, the processing unit 130 is also communicatively coupled to the cryptographic registers and is able to read and/or write data to registers within the first and second sets 210, 220. The first and second sets of registers 210, 220 thus provide an interface between the processing unit 130 and the cryptographic permutation unit 140.

In one case, the cryptographic registers of the processor interface 120 may be memory mapped to the address space of the processing unit 130. This may be achieved either directly, e.g. via a bus of the processing unit 130, and/or via a Memory Management Unit (MMU). Different cryptographic registers may be accessed in different manners if desired. If a given cryptographic register is memory-mapped, then a read or write to a specific address in memory by the processing unit 130 may be mapped to a read or write to the given cryptographic register (or a portion of said register). In a Reduced Instruction Set Computing (RISC) Instruction Set Architecture (ISA), such as RISC-V, the cryptographic registers of the processor interface 120 may be implemented as one or more Control and Status Registers (CSRs) and/or one or more vector extensions, e.g. in the latter case, a cryptographic register may be viewed as one or more vector registers.

In certain examples, the processor interface 120 may be implemented using one or more auxiliary processor interface mechanisms such as processor interrupts, Direct Memory Access (DMA), and ISA Extensions. For example, the processor interface 120 may enable the cryptographic permutation unit 140 to invoke interrupts on the processing unit 130 and/or perform DMA operations on a bus associated with the processing unit 130 (e.g. a bus of the processing unit 130 or a bus the processing unit 130 is coupled to). Alternatively, or additionally, control interactions performed by way of the processor interface 120 may be implemented as an Instruction Set Architecture extension.

In certain examples, a command to perform a specific cryptographic permutation operation may be encoded as a single machine code instruction, e.g. a single instruction executed by the processing unit 130 acts to perform the cryptographic permutation. For example, the single machine code instruction may, by way of the processor interface 120, activate the cryptographic permutation unit 140, which performs the permutation and returns the result to the processing unit 130 by way of the processor interface 120. In one case, the cryptographic permutation unit 140 may set a control flag within the second set of control registers 220, which may be checked by the processing unit 130 to determine when the cryptographic permutation is complete, at which point the result of the cryptographic permutation may be read by the processing unit 130 from the first set of data registers 210. In one case, the cryptographic permutation unit 140 may trigger, via the processor interface 120, an interrupt that is received by the processing unit 130 to indicate that the cryptographic permutation is complete. On receipt of the interrupt, the processing unit 130 may again access a result of the cryptographic permutation from the first set of data registers 210. Implementing control interactions of the processor interface 120 using an ISA Extension may provide one way of allowing the cryptographic permutation to be encoded as a single machine code instruction for the processing unit 130.

In certain examples, the cryptographic permutation unit 140 performs a cryptographic permutation on data stored within at least one of the cryptographic registers, e.g. one of the first set of data registers 210. In one case, the cryptographic permutation unit 140 performs a cryptographic permutation in accordance with control data stored within the second set of control registers 220. The cryptographic permutation may involve one or more operations that are performed on a cryptographic state. This cryptographic state may comprise a collection of bits, e.g. a sequence of 256, 512 or 1600 binary values. The cryptographic permutation may be used to update the cryptographic state. The updating of the cryptographic state may then provide a framework for a variety of cryptographic functions, such as hashes, encryption and decryption functions and number generators. In a case where the cryptographic permutation is performed on a set of bits of size b (e.g. 300, 512 or 1600), then the processor interface 120 may comprise a plurality of cryptographic registers that are b bits in length. In certain cases, data may be loaded in and out of the cryptographic registers in words of length w (e.g. where w<b), where w may correspond to a word size of the processing unit 130.

In one case, the cryptographic permutation unit 140 implements cryptographic permutation that provides a "random-like function" on a block of data. The cryptographic permutation may be performed for a plurality of "rounds", where each round or a set of rounds also constitutes a cryptographic permutation. The cryptographic permutation may be a keyless permutation, e.g. may not involve a cryptographic key. For example, the cryptographic permutation may be distinct from a block cipher in that it is not controlled by an explicit secret encryption key (although a part of a permutation state may be designated as secret "capacity"). Also, there is rarely a need to compute the inverse of the permutation, unlike with block ciphers. Each round may be similar to other rounds. In certain cases, rounds may be differentiated via the use of a round constant and/or domain separator parameters. A round constant may be a plurality of bits that varies in value across a plurality of rounds. The use of a varying round constant may help to cryptographically "separate" rounds. Domain separation parameters may also comprise a plurality of bits and may be used in a similar manner to the round constants to separate different domains of use (e.g. encryption vs decryption or hashing vs random number generation). Round constants may be used together with, or independently from, separation parameters. Further details of an example cryptographic permutation are described in UK Patent Application 1903674.8, which is incorporated by reference herein.

The cryptographic permutation unit 140 may be configured to perform many different cryptographic permutations. For example, a set of FPGAs may be programmed for a particular use case, and/or the cryptographic permutation may be defined within updatable firmware. As one example, the cryptographic permutation unit 140 may be configured to perform a KECCAK-p permutation, e.g. as described in the Federal Information Processing Standards (FIPS) 202 (or Secure Hash Algorithm 3-"SHA-3"-standard)—"SHA-3 Standard: Permutation-Based Hash and Extendable-Output Functions", FIPS PUB 202, National Institute of Standards and Technology (NIST), August 2015, which is incorporated herein by reference. As described in Section 3 of the FIPS 202 standard, each round of a cryptographic permutation may comprise a composition of five individual (permutation) steps: theta: $\theta(A)$, rho: $\rho(A)$, pi: $\pi(A)$, chi: $\chi(A)$, and iota $\iota(A, i_r)$. The last step takes in round-constant parameter $i_r$. The composite round function in this standard may thus be defined as:

$$Rnd(A,i_r)=\iota(\chi(\pi(\rho(\theta(A)))),i_r).$$

In this example, the cryptographic permutation unit 140 may be configured to perform this composite round function—Rnd, e.g. either for one round or for a plurality of rounds. When the size of permutation input A is 1600 bits, a composition of twenty-four of these round functions (with specific round constants $i_r$) constitutes KECCAK-p[1600, 24]. This then provides a basic building block of SHA-3/SHAKE hash functions as described in the FIPS 202 standard. It also provides a basic building block for many other derivative primitives. Beyond KECCAK-p, other examples of cryptographic permutations include the 320-bit permutation of ASCON, described by Christoph Dobraunig, Maria Eichlseder, Florian Mendel and Martin Schläffer, in "Ascon v1.2" Proposal to NIST LWC standardization effort, March 2019 and the 512-bit SNEIK permutation, described by Markku-Juhani O. Saarinen in "SNEIKEN and SNEIKHA: The SNEIK Family of Lightweight Cryptographic Algorithms", Proposal to NIST LWC standardization effort, March 2019, both of which are incorporated by reference herein.

Figure 3:
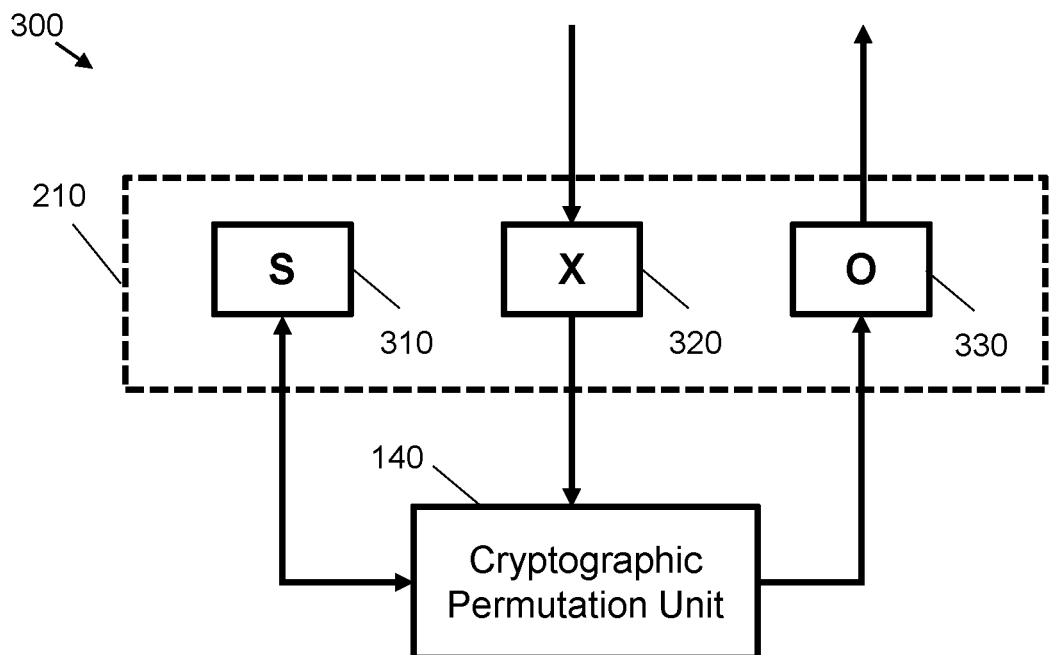
FIG. 3 is a schematic illustration showing a first set of cryptographic registers for a processor interface according to an example.

FIG. 3 shows one example of a set of cryptographic registers 300 that may form part of the processor interface 120. In this example, the set of cryptographic registers 300 form part of the first set of data registers 210 shown in FIG. 2, but in other cases may form part of a single common set of data and control registers. In FIG. 3, the set of cryptographic registers 300 comprise a permutation state register 310 to store a permutation state (S); a permutation input register 320 to store permutation input data (X); and a permutation output register 330 to store output data (O). These registers may all be b bits in length (or capable of storing b bits). In this example, the permutation input register 320 is writable by the processing unit 130 and the permutation output register 330 is readable by the processing unit 130. The processing unit 130 may thus instruct the loading of data for the cryptographic permutation into the permutation input register 320 and also instruct the loading of data resulting from the cryptographic permutation from the permutation output register 330.

In FIG. 3, the cryptographic permutation unit 140 is able to read data from, and write data to, the permutation state register 310. For example, the cryptographic permutation unit 140 may read a current permutation state value (e.g. of b bits) from the permutation state register 310 prior to a cryptographic permutation and then write an updated permutation state value (e.g. following the cryptographic permutation of the state) back to the permutation state register 310. In other cases, the input and output state values may be read from and written to different registers. The permutation state register 310 may not be visible to (e.g. readable or writable by) the processing unit 130. If the permutation state register 310 is not visible, this may increase security (as the state cannot be directly manipulated by the processing unit 130) and encapsulate functionality in a manner that simplifies application of the cryptographic permutation (e.g. the manufacturer of the processing unit 130 need not know how the permutation is performed on the state).

In FIG. 3, the cryptographic permutation unit 140 is able to read data from the permutation input register 320. The data read from the permutation input register 320 may be combined with the permutation state read from the permutation state register 310. In one case, data from the permutation input register 320 may be combined with the permutation state read from the permutation state register 310 using an XOR operation. The cryptographic permutation unit 140 may perform the cryptographic permutation on a result of the combination. In FIG. 3, the cryptographic permutation unit 140 is able to write data to the permutation output register 330. This data may comprise an output of the cryptographic permutation, e.g. as performed as described above.

Figure 4:
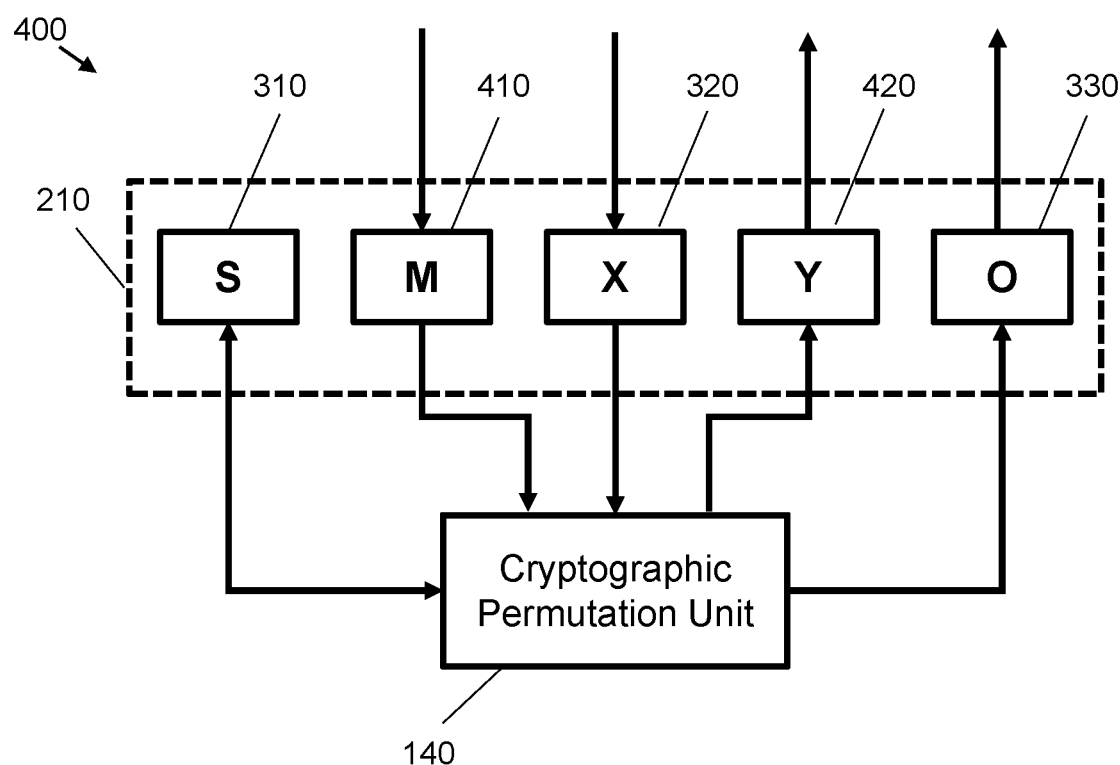
FIG. 4 is a schematic illustration showing a second set of cryptographic registers for a processor interface according to an example.

FIG. 4 shows another example of a set of cryptographic registers 400. The example of FIG. 4 extends the example of FIG. 3, e.g. may be provided where more functionality is desired. The set of cryptographic registers 400 includes the permutation state register 310, the permutation input register 320 and the permutation output register 330 (S, X and O respectively). These may operate in a similar manner to the example of FIG. 3.

In FIG. 4, the set of cryptographic registers 400 also includes a mask input register 410 to store an input mask (M) and a combination output register 420 to store a result (Y) of combining data in the permutation state register 310 and data in the permutation input register 320. In one case, the combination output register 420 comprises an XOR output register, e.g. where the combination is an XOR operation. In FIG. 4, the mask input register 410 is writable by the processing unit 130 and the combination output register 420 is readable by the processing unit 130. The cryptographic permutation unit 140 is able to read data from the mask input register 410 and to use this data to perform a masking operation, e.g. as part of, or prior to, the cryptographic permutation. The cryptographic permutation unit 140 is also able to write an output of the combination to the combination output register 420; the processing unit 130 may then read the output of the combination from the combination output register 420, e.g. the processing unit 130 may use the output of the combination as well as the permutation output register 330 in a higher level cryptographic operation.

In one example, a cryptographic architecture 110, e.g. with components as set out in one or more of FIG. 3 or FIG. 4, further comprises circuitry to apply an input XOR operation. For example, this circuitry may receive data derived from the permutation input data from the permutation input register 320 and data derived from the permutation state from the permutation state register 310 and apply the input XOR operation to this data.

In one case, the circuitry may apply the input XOR operation to the permutation input data and the permutation state and a result of the input XOR operation may be written to the combination output register 420. In another case, the circuitry may apply the input XOR operation to the permutation input data and a modified version of the permutation state; in this case, the circuitry to apply an input XOR operation may be communicatively coupled to, or form part of, the cryptographic permutation unit 140. In this latter case, the circuitry may provide the result of the input XOR operation to the cryptographic permutation unit 140, such that the cryptographic permutation may be performed on this result. In certain examples, two sets of circuitry may be used to provide each use case.

In one example, a cryptographic architecture 110, e.g. with components as set out in one or more of FIG. 3 or FIG. 4, further comprises permutation masking circuitry to apply a masking operation to the permutation state, e.g. as read from the permutation state register 310. This may be one implementation of the above described circuitry to apply an XOR operation. The permutation masking circuitry may be communicatively coupled to the mask input register 410 and the permutation state register 310. The masking operation may apply a mask from the mask input register 410 to the permutation state. In one case, the mask may be applied using an AND operation.

Figure 5:
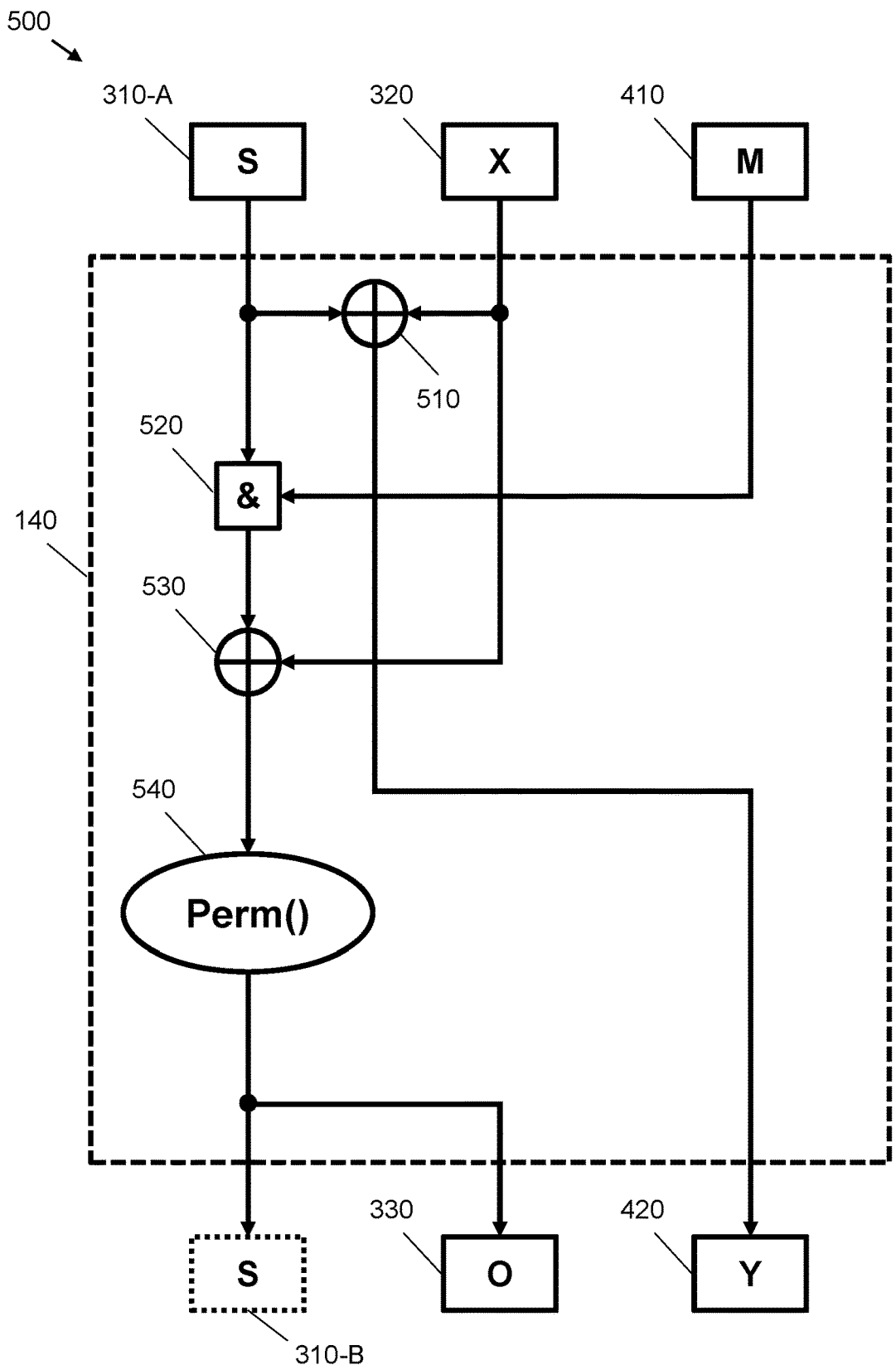
FIG. 5 is a schematic illustration showing a cryptographic permutation unit according to an example.

FIG. 5 shows an example implementation 500 of the circuitry described above. In the example of FIG. 5, the circuitry is implemented as part of the cryptographic permutation unit 140; in other examples, the circuitry may be implemented outside of the cryptographic permutation unit 140, e.g. between the data registers 210 and the cryptographic permutation unit 140. Similar functionality and connectivity applies in both cases. FIG. 5 shows the permutation state register 310-A, the permutation input register 320, and the mask input register 410 communicatively coupled as inputs to the cryptographic permutation unit 140. In this example, the cryptographic permutation unit 140 also outputs data to the permutation state register 310-B, the permutation output register 330 and the combination output register 420. The permutation state register is shown dashed as component 310-B, as this may be the same component as 310-A, however, it is easier to understand the operation of the cryptographic permutation unit 140 by denoting these separately. For example, in one case, the cryptographic permutation unit 140 may output an updated permutation state that may be written to the permutation state register, effectively overwriting the previous permutation state that is accessed as the input. In other cases, different registers or different portions of a common register may alternatively be used to store an input and output permutation state.

The cryptographic permutation unit 140 comprises first XOR circuitry 510, AND circuitry 520, second XOR circuitry 530 and permutation circuitry 540. The first XOR circuitry 510 may implement one case of the circuitry to apply an input XOR operation as described above; the AND circuitry 520 may implement the permutation masking circuitry as described above; and the second XOR circuitry 530 may implement the input application circuitry (or the other case of the circuitry to apply an input XOR operation) as described above. In FIG. 5, black circles illustrate a communicative coupling; crossing of connections without a black circle are not communicatively coupled. In FIG. 5, the first XOR circuitry 510 is communicatively coupled to the permutation state register 310-A and the permutation input register 320. The first XOR circuitry 510 applies a logical XOR operation and provides the output to the combination output register 420. The AND circuitry 520 applies a logical AND operation to data read from the mask input register 410 (i.e. a mask) and data read from the permutation state register 310-A (i.e. the permutation state). The AND circuitry 520 is communicatively coupled to the second XOR circuitry 530. The second XOR circuitry 530 applies a logical XOR operation to data read from the permutation input register 320 (e.g. an XOR input) and the output of the AND circuitry 520 (e.g. a modified or masked permutation state). The second XOR circuitry 530 is communicatively coupled to the permutation circuitry 540. The permutation circuitry 540 is configured to apply the cryptographic permutation to the output of the second XOR circuitry 530 and to supply the result of the cryptographic permutation to the permutation state register 310-B and the permutation output register 330. The processing unit 130 may read the result of the cryptographic permutation from the permutation output register 330. The permutation state originally stored in the permutation state register 310-A may be overwritten by the result (e.g. permutation state register 310-B may be the same register storing a different value S' at a different point in time). In one case, the result of the cryptographic permutation may be copied to each of the permutation state register 310-A and the permutation output register 330.

The example implementation 500 of FIG. 5 performs a number of operations that may be described using a vector notation. For example, the data within the permutation state register 310 at a start of a cryptographic permutation may be referred to as a vector S—a start state. The data within the permutation state register 310 following a cryptographic permutation may be referred to as a vector S'—an updated state. The state may have b bits as described above. The data within the permutation input register 320 may be referred to as a vector X and the data within the mask input register 410 may be referred to as a vector M. The logical AND and XOR operations may operate on vectors of b bits (e.g. having a width equal to the whole width of the permutation state). This may allow for rapid computation, as the state need not be decomposed into sub-vectors in order to perform the cryptographic permutation. If the size of each register (e.g. the available memory) is greater than b (e.g. selected as a value that covers a large family of cryptographic operations), then a subset of b bits (e.g. the first or last b bits) may be accessed in any one particular operation. Each vector of b bits may be a sequence of bits each having a value of 0 or 1.

Given the notation described above, the operation of the cryptographic permutation unit 140 in FIG. 5 may be summarised as:

$$Y = S \text{ XOR } X$$

$$O = S' = \text{Perm}((S \text{ AND } M) \text{ XOR } X)$$

Hence, in an update operation, S=S'. In other words, the permutation state S is first XORed with input X and the output is written to Y. In this example, the permutation state S is also masked with M, and the result is also XORed with input X and subjected to cryptographic permutation Perm( ). The resulting new permutation state S' is written to the permutation output O. For the next operation, the permutation state S is set as S=S'.

In certain examples, the permutation state may be internally divided into a plurality of portions. These portions may comprise a predefined number of bits. In one case, the permutation state is divided into a "secret" set of c-bits known as the "capacity" and a "public" set of r-bits known as the "rate", wherein b=r+c. During cryptographic operations, the processing unit 130 may only access (e.g. interact with) the "rate" bits. For example, only the "rate" bits may be read and/or written to leaving the capacity bits untouched. The values of b, r and c may affect mask selection during encryption and decryption operations, and may be configured according to implementation specifications. The "capacity" bits may be associated with a scheme security while the "rate" bits may be associated with a speed of processing. For example, making c larger may increase the security of the scheme, while making r smaller may increase a speed of processing.

The processing unit 130 may use the cryptographic architecture 110 in a number of different ways. In one case, the processing unit 130 may use the cryptographic architecture 110 to perform one or more of the following cryptographic operations: an "absorb" cryptographic operation to mix input data with a permutation state; a "squeeze" cryptographic operation to obtain an output using the permutation state; an "encrypt" cryptographic operation to encrypt input data using the permutation state; and a "decrypt" cryptographic operation to decrypt input data using the permutation state. The "absorb" and "squeeze" operations may be used, for example, for cryptographic hashing. The "encrypt" and "decrypt" operations may be used, for example, for the construction of authenticated encryption and decryption modes. Examples of these cryptographic operations, and how they may use the cryptographic architecture 110 are set out below.

In an "absorb" operation input data is mixed with the permutation state. The input data may comprise data from the permutation input register 320. An absorb operation may be used to initialize the permutation state or to operate the permutation directly. The absorb operation may follow the operation of the cryptographic permutation unit 140 described above with reference to FIG. 5:

$$S' = \text{Perm}((S \text{ AND } M) \text{ XOR } X)$$

$$S = S'$$

In this example operation, the permutation state S is first masked with the mask input M (e.g. the contents of the mask input register 410). Then an XOR operation is performed between the result and the permutation input X (e.g. the contents of the permutation input register 320). This forms the input to the cryptographic permutation. The output is written back to permutation state register 310. In one case, the Perm( ) function may comprise the KECCAK-p Rnd operation performed as an atomic operation. In this case, multiple iterations of the KECCAK-p Rnd operation may be performed as part of the cryptographic permutation, where the permutation is performed as a discrete single operation by the cryptographic permutation unit 140.

In one operational case, the mask input M may be set to zero, i.e. $M = 0^b$ (a vector of "b" zero bits), which results in the operation:

$$S' = \text{Perm}(X)$$

This may be used to initialize the system or set secret keys, amongst other functions. In another operational case, the mask input M may be set to one, i.e. $M = 1^b$ (a vector of "b" one bits), which results in a "sponge" absorb operation:

$$S' = \text{Perm}(S \text{ XOR } X)$$

By configuring the bits of the mask input M, different overwrite combinations may be enacted. This may also be used to construct secure hashes.

In a "squeeze" operation, output may be extracted from the permutation state. For example, if the input permutation state is S and the output permutation state is S' then:

$$O = S' = \text{Perm}(S)$$

$$S = S'$$

In the "squeeze" operation, the permutation state S is directly subjected to the cryptographic permutation and the result is written back to permutation state register 310, which now has the new value S'. The output may also be written to O, where it can be read from by the processing unit 130. In a hashing operation, a portion of the output O comprising the r "rate" bits may be used by the processing unit 130 as a hash operation output. It may also be seen how a "squeeze" operation is equivalent to an "absorb" with $M=1^b$ and $X=0^b$.

An "encrypt" operation may be seen as an "absorb", with X representing the data to encrypt (i.e. plaintext data) as written to the permutation input register 320 by the processing unit 130 and the output state O being copied to the permutation output register 330 after the operation, where the "ciphertext" is read from the permutation output register 330 by the processing unit 130:

$$O=S'=\text{Perm}((S \text{ and } M)\text{XOR } X)$$

$$S=S'$$

In this operation, M may be set to $M=1^b$, X has the role of plaintext and O represents ciphertext. Again, only part of X and O, e.g. the r "rate" bits may be read and/or used by the processing unit 130. The c "capacity" may be ignored by the processing unit 130.

A "decrypt" operation may be seen as the inverse of an "encrypt" operation. In this case, X (e.g. the contents of the permutation input register 320) may be seen as ciphertext and Y forms the decrypted plaintext (e.g. as read from the combination output register 420). In this case:

$$Y=S \text{ XOR } X$$

$$O=S'=\text{Perm}((S \text{ AND } M)\text{XOR } X)$$

$$S=S'$$

If, for example, the r "rate" bits are taken as a left-hand-side portion of a permutation state S, with the c "capacity" bits taken as a right-hand-side portion of the permutation state S, then M may be set as $M=1^r 0^c$. In this case, the ciphertext X is overwritten using the permutation state S, as the left r bits of X are assumed to be zeros. The corresponding plaintext may be read by the processing unit 130 by taking the right r bits of Y.

In the examples described herein, the cryptographic registers may be arranged in w-bit words, where the size of w is determined by the architecture of the processing unit 130. For example, w may be 32 for systems with a 32-bit datapath or w=64 for systems with a 64-bit datapath. If an input and output of the cryptographic permutation is b bits (e.g. for KECCAK-p and SHA-3, b=1600), then the processing unit 130 may access the registers as a set of n=b/w words. For example, the permutation state S', e.g. as copied to the permutation output register 330 may be accessed as 50 words on a 32-bit system. However, the cryptographic architecture 110 is configured so that the contents of the full registers may be accessed in a single cycle by the cryptographic permutation unit 140. This arrangement may greatly speed up data processing. For example, the data registers 210, including those shown in FIGS. 3 and 4, may each be b bits in size (or able to store b bits).

Figure 6:
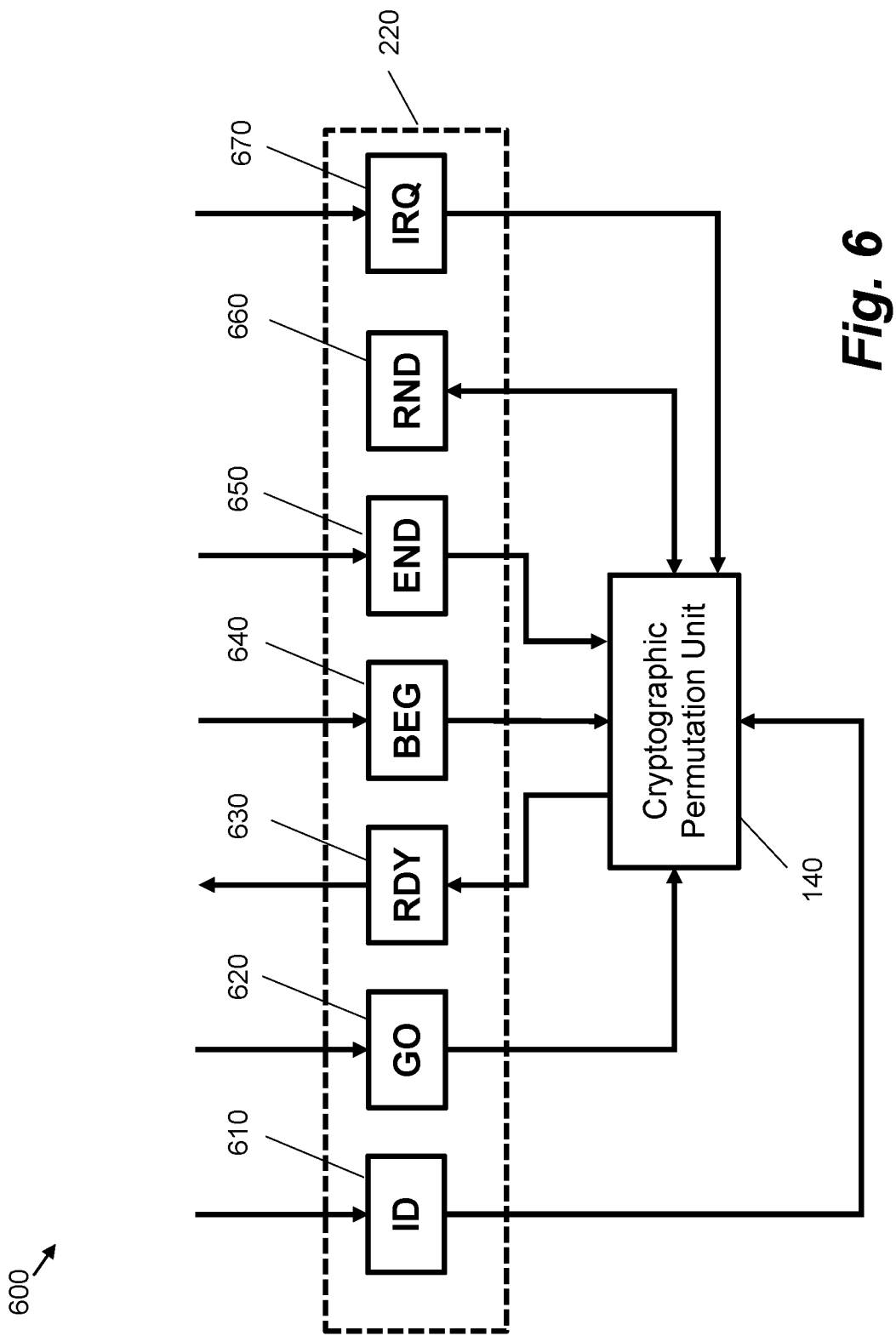
FIG. 6 is a schematic illustration showing a set of control registers for a processor interface according to an example.

FIG. 6 shows another example of a set of cryptographic registers 600. In this example, a set of control registers 220 are shown. These may be provided as well as the data registers 210 shown in one of FIG. 3 or 4. FIG. 6 shows an example with seven control registers 220; different examples and implementations may use different numbers of control registers, or a single register divided into portions, depending on requirements. In FIG. 6, the control registers 220 comprise: an identifier (ID) register 610; a start (GO) register 620; a ready (RDY) register 630; a set of round registers 640, 650, 660; and an interrupt (IRQ) control register 670.

The identifier register 610 is writable by the processing unit 130 and stores an identifier of a cryptographic operation to be performed. For example, the identifier register 610 may store one or more domain separator parameters as described above. The value of the identifier may be used to configure the cryptographic permutation according to a particular cryptographic operation, e.g. by ensuring that different values written to identifier register 610 produce different outputs, e.g. as read from the permutation output register 330.

The start register 620 is writable by the processing unit 130 and stores a start (or restart) flag for a cryptographic operation. For example, the start register 620 may store a binary flag having values of 0 and 1, wherein a value of 1 indicates that the cryptographic permutation unit 140 is to start a cryptographic operation (e.g. by performing a cryptographic permutation as described above). The start register 620 may be 0 by default and may be written to by the processing unit 130 (e.g. set to 1) to instruct the cryptographic architecture 110 (and/or cryptographic permutation unit 140) to perform a cryptographic operation on behalf on the processing unit 130.

The ready register 630 is readable by the processing unit 130 and stores a ready flag indicating that the cryptographic architecture 110 (and/or cryptographic permutation unit 140) is ready to start another cryptographic operation and/or that a result of a cryptographic permutation is ready to be read by the processing unit 130. This, like the start flag, may be a binary flag where 0 indicates that the cryptographic architecture 110 is not ready (e.g. is in use or is busy) and where 1 indicates that the cryptographic architecture 110 is ready to start a cryptographic operation. The ready register 630 may be useful in computing devices with multiple processing units (e.g. multicore processors or microprocessors), where each of the multiple processing units may have access to the cryptographic architecture 110, e.g. where they each are communicatively coupled to the processor interface 120. This may be the case where the processor interface 120 is coupled to a systems bus that also couples the multiple processing units. In a case where the ready register 630 is used to indicate that a result of a cryptographic operation is ready for reading from the data registers 210, a value of 1 may indicate to the processing unit 130 that a result of a cryptographic permutation is available from the permutation output register 330 and a value of 0 may indicate that an operation is still in progress.

The set of round registers 640, 650, 660 are writable by the processing unit 130 and store one or more flags relating to rounds of cryptographic permutation. In FIG. 6, there are three round registers: a begin (BEG) round register 640, an end (END) round register 650 and a round data (RND) register 660. The begin round register 640 and the end round register 650 are writable by the processing unit 130 to respectively store a start round (a first round to be processed) and an end round (a last round to be processed). The start and end round may be indicated with integer values. The round data register 660 may or may not be writable or accessible by the processing unit 130. In a case, where the round data register 660 stores a round count to keep track of a current round (e.g. as an integer value) then the round data register 660 may not be accessible by the processing unit 130. In another case, the round data register 660 may store a round constant indicating a number of rounds to perform. Different implementations are possible depending on requirements.

The interrupt control register 670 is writable by the processing unit 130 and stores a flag indicating whether interrupts are enabled or disabled. For example, the interrupt control register 670 may store a binary flag where 0 indicates that interrupts are disabled and 1 indicates that interrupts are enabled. Interrupts, in this example, refer to interrupts for the processing unit 130 that interrupt a series of instructions being executed by the processing unit 130. If interrupts are enabled, they may be used to indicate that a cryptographic operation (including a cryptographic permutation) is complete and/or that the cryptographic architecture 110 is ready to process input (e.g. if it has been in use by another processing unit). The processing unit 130 may set whether interrupts are used based on a current device configuration and/or for a particular cryptographic operation. If interrupts are not used (e.g. the flag is set to 0), then a processing unit 130 may instead poll the ready register 630 to determine whether an event has occurred.

The example set of cryptographic registers 600 in FIG. 6 thus enable the processing unit (or multiple processing units) to control the operation of the cryptographic architecture 110 and the cryptographic permutation unit 140. Having a unified and common processor interface 120 for control and data may help simplify integration of the cryptographic architecture 110. It also enables a single coupling to a larger computing device, e.g. the cryptographic architecture 110 may be easily added to a mother or control board for a larger computing device. Although, the set of cryptographic registers 600 are shown as separate register in FIG. 6, some or all of the contents of these registers may alternatively be grouped as fields in one or more control registers (e.g. the binary flags described above may comprise different bits of an 8-bit register).

Figure 7:
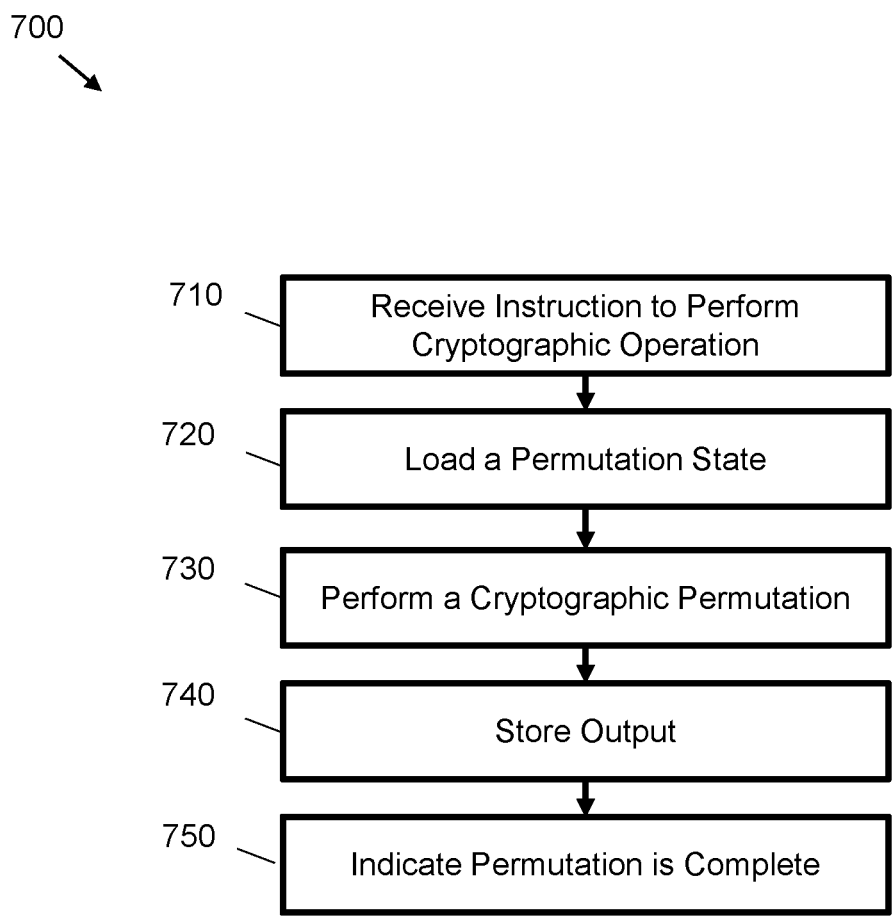
FIG. 7 is a flow diagram showing a method of performing a cryptographic operation according to an example.
Figure 8A:
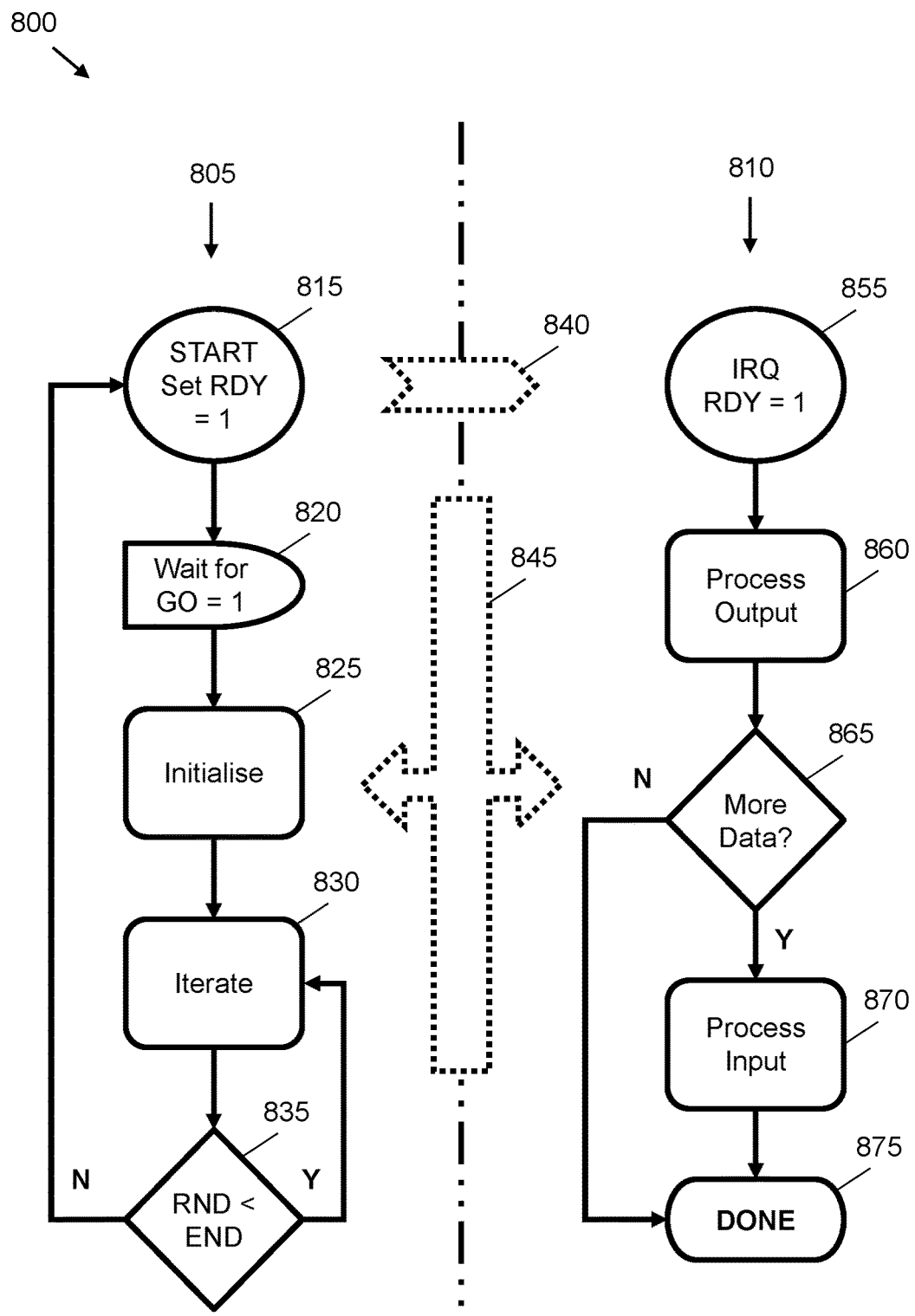
FIGS. 8A and 8B are flow diagrams respectively showing first and second operation sequences performed by a cryptographic architecture and a processing unit according to an example.
Figure 8B:
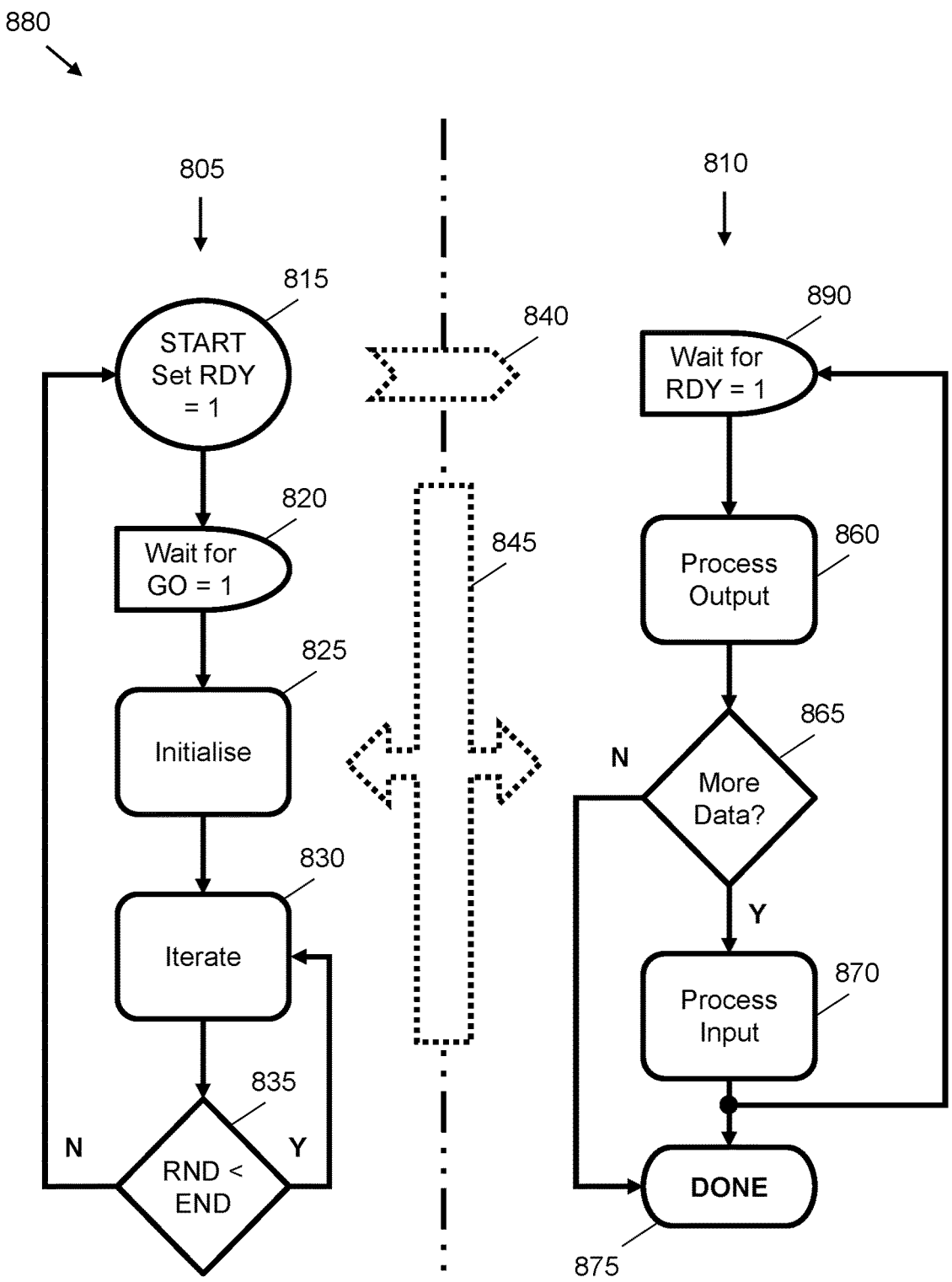

FIGS. 7, 8A and 8B illustrate certain methods of controlling a cryptographic architecture, such as that shown in FIGS. 1 to 6. The cryptographic architecture may be controlled to perform a cryptographic operation, e.g. at least one processing unit may control the cryptographic architecture via a processor interface. In certain cases, the cryptographic architecture may be used in a manner that facilitates input preparation and to allow output unloading to occur concurrently with permutation computation.

FIG. 7 shows a method 700 of performing a cryptographic operation according to an example. The method 700 may be performed by a cryptographic architecture such as the cryptographic architecture 110 of FIG. 1. In one case, the method 700 may be performed by a cryptographic permutation unit within the cryptographic architecture, such as the cryptographic permutation unit 140 shown in FIGS. 1 to 6.

The method starts at block 710, which comprises receiving an instruction to perform the cryptographic operation from a processing unit. This may comprise receiving a signal from the processing unit 130 via the processor interface 120 of FIG. 1. In one case, the cryptographic permutation unit 140 may monitor the start register 620 in FIG. 6, and block 710 may comprise loading a value from the start register 620 and determining whether it indicates a positive start signal (e.g. a value of 1).

At block 720, a permutation state is loaded from one of a set of cryptographic registers. This may comprise the cryptographic permutation unit 140 loading data from the permutation state register 310 as shown in FIGS. 3 to 5. The permutation state may not be accessible by the processing unit.

At block 730, a cryptographic permutation is performed on data derived from the permutation state. The data may comprise the permutation state itself or, as shown in FIG. 5, a number of logic operations may be applied to the permutation state before performing a cryptographic permutation. Block 730 may be performed by the cryptographic permutation unit 140 of FIGS. 1 to 6, using data stored in the cryptographic registers of the processor interface 120. Block 730 may comprise reading data from multiple data registers 210 within processor interface 120, such as is shown in FIG. 5.

At block 740, the method 700 comprises storing an output of the cryptographic permutation in one of the set of cryptographic registers. For example, this may comprise copying the output of the cryptographic permutation to the permutation output register 330. It may also comprise storing the same output in the permutation state register 310. Read/write operations on the data registers 210 may be performed by the cryptographic permutation unit 140.

At block 750, the method 700 comprises indicating to the processing unit that the permutation is complete. The processing unit is then able to access the output of the cryptographic permutation from the set of cryptographic registers, e.g. via the processor interface 120 of FIG. 1. In one case, block 750 may comprise the cryptographic permutation unit 140 sending an interrupt to the processing unit (e.g. if an interrupt more is enabled). Alternatively, or additionally, block 750 may comprise writing a flag value to the ready register 630 (e.g. a value of 1). The processing unit may read the output of the cryptographic permutation from the set of cryptographic registers, e.g. from permutation output register 420.

In one case, the method may comprise indicating via one of the set of control registers that the cryptographic permutation unit is ready to begin processing. For example, this may be indicated by the ready register 630 as shown in FIG. 6. In examples, the operation of the processing unit and the cryptographic permutation unit 140 may be synchronised based on one or more of an interrupt and a state of one of the set of control registers, e.g. a start of a process flow may be synchronised based on one or more of these.

In one case, the method may comprise loading, by the cryptographic permutation unit, a round count from a round control register, such as the round data register 660. The round count may be used in the in the cryptographic permutation, e.g. as a round constant input. Following the cryptographic permutation, the round count in the round control register may be incremented. The loading, using and incrementing operations may be repeated based on a comparison of the round control register and an end control register, such as the end round register 650 in FIG. 6.

In one case, the method may comprise loading permutation input data from a permutation input register, such as the permutation input register 320. Mask input data may then be loaded from a mask input register, such as mask input register 410. In this case, performing the cryptographic permutation at block 730 may comprise updating, by the cryptographic permutation unit, the permutation state in the permutation register by performing an XOR operation as a function of the permutation input data and a result of an AND operation performed on the mask input data and the permutation state. In this case, block 640 may comprise loading the updated permutation state into the permutation state register, e.g. permutation state register 310 in FIGS. 3 and 4. For example, this may comprise operations performed by an arrangement as shown in FIG. 5.

FIGS. 8A and 8B show two example modes of operation 800 of a cryptographic module, such as the cryptographic architecture 110 of FIG. 1 (e.g. as implemented by the cryptographic permutation unit 140). The left-hand side 805 of FIGS. 8A and 8B shows operations that are performed by the cryptographic module, such as the cryptographic permutation unit 140 of FIGS. 1 to 6. The right-hand side 810 of FIGS. 8A and 8B shows corresponding operations that may be performed when executing a controlling program on a processing unit, such as processing unit 130 of FIG. 1. The two sides of FIGS. 8A and 8B show how the operations of the cryptographic module and the processing unit may be synchronised.

The left-hand side operations 805 begin when a ready (RDY) flag is set at block 815 to indicate that the cryptographic module is ready to perform a cryptographic operation. This may be performed via an interrupt and/or via the cryptographic module setting a ready register (such as ready register 630) to have a particular value (e.g. 1). In certain cases, setting the ready flag to one may also trigger a processing unit interrupt that informs the processing unit that the cryptographic module is ready. In other cases, the processing unit may periodically read the ready register to look for a particular of value (e.g. 1) or a change in value (e.g. from 0 to 1). The synchronisation based on the ready flag value is shown via arrow 840, with the interfacing registers, e.g. as provided by the processor interface 120, shown as 845. At block 855 in FIG. 8A, the processing unit receives an interrupt based on the ready flag value (e.g. indicating that the ready flag has a value of 1 indicating that the cryptographic module is ready for processing). FIG. 8A shows a case where interrupts are enabled. FIG. 8B shows an alternative case where interrupts are not enabled; in FIG. 8B, at block 890, the processing unit monitors a value of the ready flag (e.g. by periodically polling the ready register) and starts operations when this value is set to 1.

Once the ready flag is set to 1, and the cryptographic module is ready to perform processing at block 815, the cryptographic module proceeds to block 820, where it waits for a start flag to be set indicating a new cryptographic operation is to be performed (e.g. indicated by the start flag set to 1). Block 820 may comprise the cryptographic permutation unit 140 monitoring a value stored in the start register 620 as shown in FIG. 6.

While the cryptographic module is waiting for a start signal, the processing unit, following one of block 855 in FIG. 8A (e.g. an interrupt indicating ready=1) or block 890 in FIG. 8B (e.g. the processing unit reads the value of the ready register 630 and determines it is 1), starts processing an old output of the cryptographic module at block 860. For example, when the ready flag is seen to be 1, the processing unit may start a new operation and read the contents of one or more of the permutation output and the combination output. This latter operation may comprise reading values respectively stored in the permutation output register 330 and the combination output register 420.

Following block 860, the processing unit performs a check at block 865 to determine if there is more data to process. As described in more detail below, for a new cryptographic operation the values read at block 860 may be ignored and there will be more data to process. If the processing unit is following up on a previously instructed cryptographic operation, e.g. where a result is now ready, there may not be further data to process. If there is more data to process, then the method proceeds to block 870, where new input values are prepared by the processing unit. This may comprise writing new values for the permutation input (X) and/or the mask input (M) to the permutation input register 320 and the mask input register 410 respectively. Once the new values are written, the start flag is set to 1 to initiate a new cryptographic permutation. Again, the writing of new values and a value of 1 to the start register 620 may be performed at the same time, e.g. as part of one write cycle. The design of the processor interface 120 facilitates this operation.

If the processing unit sets the start flag, e.g. initially at block 870, the cryptographic module proceeds from block 820 to block 825. This may be performed in parallel with one or more of blocks 860, 865 and 870 within the processing unit program flow. At block 825, the cryptographic module performs an initialisation operation. This may comprise an atomic operation, e.g. a number of different events may take place simultaneously as a single operation on at least one clock cycle of the cryptographic module. Block 825 may comprise one or more of the following operations: setting the start flag to 0 (to indicate processing has started); setting the ready flag to 0 (to indicate that the cryptographic module is unable to process further cryptographic requests at this time); setting the permutation output (O) as the current permutation state (S); performing an XOR operation on the permutation input (X) and the permutation state (S) to set the value of the combination output (Y); loading the permutation state (S) as S=((S AND M) XOR X); and setting a round count flag to a round beginning flag. Hence, block 825 may comprise storing a value of 0 in the start register 620 and the ready register 630; copying the contents of the permutation state register 310 to the permutation output register 330; storing the output of the first XOR circuitry 510 in the combination output register 420; loading a value of the permutation state into temporary memory as the output of the second XOR circuitry 530; and copying the value of the begin round register 640 into the round data register 660. These components of the cryptographic architecture are configured such that the operations of block 825 may be performed in parallel. This enables them to be performed as an atomic operation and greatly increases the speed of the cryptographic operation.

Following initialisation at block 825, the cryptographic module performs an iteration (i.e. a round) of a cryptographic permutation at block 830. This may comprise activating the permutation circuitry 540 using the value of the initialised permutation state (S) loaded into (temporary memory) at block 825. The permutation circuitry 540 may also access a round count or constant stored with the round data register 660 (e.g. S=Round(S, RND)—as referenced above when discussing the KECCAK-p implementation). In certain cases, the permutation circuitry 540 may also access a domain separation parameter stored in the identifier register 610. The initialised permutation state (S), the round count or constant and the domain separation parameter may be supplied as the input to a permutation round (e.g. S=Round(S, RND, ID)). As part of block 830, the value of the round count may be incremented within the round data register 660 (e.g. RND=RND+1).

At block 835, in the left-hand side processing stream 805, a check is made to determine whether the round count is less than an end round value (e.g. RND<END?). This may comprise comparing integer values in the round data register 660 and the end round register 650. If the round count is less than the end round value then block 830 may be repeated. If the round count is not less than the end round value (e.g. is now equal to the end round value following the last increment at block 830), then the cryptographic permutation is complete. The method proceeds to block 815, where the ready flag is set to 1 indicating that a result of the permutation is ready, and that the cryptographic module is ready to perform a further cryptographic operation. The method then proceeds again to block 820, where the cryptographic module waits for the start flag to be set to 1 by the processing unit.

In FIG. 8A, following the processing of input at block 870 the process flow for the processing unit ends at block 875. The processing unit may thus execute different (e.g. unrelated) instructions while waiting for an interrupt to arrive indicating that a result of the cryptographic operation is ready. In this manner, the processing unit may be efficiently utilised. When the cryptographic module performs block 815, e.g. via the cryptographic permutation unit 140 storing 1 in the ready register 630, then it indicates that a result of the cryptographic operation is ready, and the processing unit starts another process flow at block 855. The processing unit thus processes an output at block 860, which may involve reading the values stored in the permutation output register 330 and the combination output register 420. The result in the combination output register 420 may have been set by the previous execution of block 825 and the result in the permutation output register 330 may be stored as part of the iteration at block 830 (e.g. O=S'=Perm((S AND M) XOR X)). Once the outputs have been read by the processing unit at block 860, then the check at block 865 is performed. If the cryptographic operation is complete (e.g. the result in the permutation output register 330 is all that is needed), then the processing unit ends its processing at block 875. If there are additional cryptographic operations to perform, then block 870 is performed again and the process repeats. In one case, new values may be written to the permutation input register 320 and the mask input register 410, while previous iterations are still being performed at block 830.

FIG. 8B shows a similar process when interrupts are not enabled or configured. In this case, following block 870 the processing unit returns to block 890 and waits for a change in the state of the ready flag to indicate that a result of the cryptographic operation is ready. The processing unit need not solely perform block 890 but may perform this block intermittently as part of a monitoring or polling process.

Certain examples described herein provide a cryptographic architecture, and methods of operating such an architecture, that efficiently interface a cryptographic permutation unit with a processing unit such as a microprocessor. Certain examples described herein provide cryptographic methods that may be suitable for implementation on low-resource microcontrollers and embedded devices, as well as for implementation for high-speed secure data processing. The described cryptographic architecture is agnostic to the type of processing unit that is used, and a processor interface allows different processing units to be coupled to the cryptographic permutation unit, with options for different control procedures being available through a common set of control registers. The cryptographic architecture may be implemented using memory mapping and/or other approaches, thus providing easy or transparent data access to different types of processing unit. Described approaches may provide a tight coupling of a keyless cryptographic permutation with processor cores either via memory-mapped registers or vector registers and instructions, wherein the processor interface provides a buffer architecture to reduce power consumption and idle cycles.

Certain examples described herein may be implemented as ISA extensions, e.g. to a wide variety of processing units. The examples may directly and/or indirectly support secure implementation of quantum-resistant symmetric and asymmetric cryptography. The processor interface described herein may be controlled via a bus architecture of the processing unit or via other input/output mechanisms. Certain examples may be configured to provide constant time and emission-protected binary arithmetic.

Certain examples described herein may be used to enable efficient hardware and/or software implementations of higher-level algorithms that use the cryptographic permutation as a "building block" higher-level algorithms. Examples of algorithms that may benefit from such an efficient hardware-software co-design include: cryptographic hash functions and message digests (e.g. the previously discussed SHA3 and SHAKE standards, SNEIKHA that forms part of the previously described SNEIK approach and the Ascon-Hash from the previously described ASCON approach); SHA3-derived functions such as Message Authentication Codes (MACs) (e.g. as described by John Kelsey, Shu-Jen Chang and Ray Perlner in "SHA-3 Derived Functions: cSHAKE, KMAC, TupleHash and ParallelHash." NIST Special Publication 800-185, National Institute of Standards and Technology—NIST, December 2016, which is incorporated by reference herein); authenticated encryption with associated data (AEAD) based on a cryptographic permutation (e.g. SNEIKEN and Ascon-AEAD as described in the previously reference SNEIK and ASCON approaches and the KEYAK approach described by Guido Bertoni, Joan Daemen, Seth Hoffert, Michaël Peeters, Gilles Van Assche, and Ronny Van Keer in "CAESAR submission: Keyak v2." Keccak Team, September 2016, which is incorporated by reference herein); PseudoRandom Number Generation (PRNG) and Key Derivation Function (KDF) constructions based on cryptographic permutations; cryptographic modes based on cryptographic primitives such as those described in Guido Bertoni, Joan Daemen, Seth Hoffert, Michaël Peeters, Gilles Van Assche, and Ronny Van Keer, "Farfalle: parallel permutation-based cryptography." IACR Cryptology ePrint Archive: Report 2016/1188, December 2016 and Guido Bertoni, Joan Daemen, Michael Peeters, Gilles Van Assche, Ronny Van Keer, and Benoit Viguier, "KangarooTwelve: fast hashing based on Keccak-p." Proc. ACNS 2018, LNCS 10892, pp. 400-418, Springer, 2018, which are both incorporated by reference herein; traditional public-key cryptographic algorithms such as Rivest-Shamir-Adleman (RSA) and Elliptic Curve Digital Signature Algorithm (ECDSA) that use permutation-based primitives as building blocks (e.g. as described in the FIPS standard 186-4); and numerous post-quantum public-key cryptographic algorithms that use cryptographic permutations as building blocks (e.g. BIKE, "Classic McEliece", Dilithium, Falcon, FrodoKEM, GeMMS, Kyber, Luov, MQDSS, NewHope, NTRU, NTS-KEM, Picnic, qTESLA, Round5, Saber, Sphincs+, and ThreeBears—as described in "Post-Quantum Cryptography: Round 2 Submissions" published by the NIST Information Technology Laboratory, March 2019, which is also incorporated by reference herein.

Although certain examples refer to accessing data within a certain register, and reading and/or writing data from such a register, it will be understood that in practice intermediary data storage and/or data structures may be used in certain implementations, and that reference to "data in" may also apply to "data derived from", e.g. data that results from one or more intermediate processes in additional to those described. References to XOR and AND refer to logic operations that respectively perform a logical "exclusive-or" and a logical "and" operation. It shown also be understood that reference to circuitry coupled to certain components may be alternatively implemented as functionality within that component, e.g. whether via executed firmware code and/or dedicated hardware circuity. "Circuitry" as described herein may be implemented in hardware, e.g. using digital logic gates or programmable gates of an FPGA, and/or as computer program code that is loaded from memory and executed by a processor, such as a microprocessor. Certain system components and methods described herein may be implemented by way of computer program code, such as firmware or an instruction set, that is storable on a non-transitory storage medium, such as a read-only updatable firmware memory.

The above examples are to be understood as illustrative. Further examples are envisaged. For example, specific values discussed herein are based on test examples and may vary depending on implementation (e.g. depending on microcontroller specifications and type, on security requirements and other factors). Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

The invention claimed is:

1. A cryptographic architecture comprising:
   a processor interface comprising a set of cryptographic registers, the processor interface being accessible by at least one processing unit, the at least one processing unit being separate from the cryptographic architecture; and
   cryptographic permutation circuitry configured to perform a cryptographic permutation using data stored within the set of cryptographic registers,
   wherein the at least one processing unit instructs the cryptographic architecture to perform the cryptographic permutation and accesses a result of the cryptographic permutation using the processor interface,
   wherein the set of cryptographic registers comprise:
      one or more control registers that are accessible to the at least one processing unit;
      a permutation state register to store a permutation state;
      a permutation input register to store permutation input data, the permutation input register being writable by the at least one processing unit;
      a permutation output register to store output data, the permutation output register being readable by the at least one processing unit, wherein the permutation state is not visible to the at least one processing unit;
      a mask input register to store an input mask, the mask input register being writable by the at least one processing unit;
      permutation masking circuitry, communicatively coupled to the mask input register and the permutation state register, to apply an AND operation to data derived from the input mask and data derived from permutation data from the permutation state register; and
      input application circuitry, communicatively coupled to the permutation masking circuitry and the permutation input register, to apply an XOR operation to data derived from the permutation masking circuitry and data derived from the permutation input data, the input application circuitry being configured to supply output data to the cryptographic permutation circuitry;
   wherein the cryptographic architecture is configured to indicate a completion of the cryptographic permutation by setting a control flag within the control registers.

2. The cryptographic architecture of claim 1, wherein the cryptographic architecture is configured to perform the cryptographic permutation based on a single machine code instruction that is executed by the at least one processing unit.

3. The cryptographic architecture of claim 2, wherein the single machine code instruction is implemented as an Instruction Set Architecture (ISA) extension.

4. The cryptographic architecture of claim 1, wherein the processor interface comprises a plurality of registers configured to store at least b-bits, where b is a size in bits of a permutation input.

5. The cryptographic architecture of claim 1, wherein the cryptographic permutation circuitry is configured to perform a KECCAK-p permutation.

6. The cryptographic architecture of claim 1, wherein the cryptographic permutation circuitry is configured to perform a keyless permutation comprising a plurality of rounds.

7. The cryptographic architecture of claim 1, wherein the at least one processing unit is able to use the cryptographic architecture to perform one or more of the following:
   an absorb cryptographic operation to mix input data with a permutation state;
   a squeeze cryptographic operation to obtain an output using the permutation state;
   an encrypt cryptographic operation to encrypt input data using the permutation state; and
   a decrypt cryptographic operation to decrypt input data using the permutation state.

8. The cryptographic architecture of claim 1, comprising:
   input XOR circuitry to apply an input XOR operation, the input XOR operation being applied to data derived from the permutation input data in the permutation input register and data derived from the permutation state in the permutation state register,
   wherein the input XOR circuitry is communicatively coupled to an XOR output register to store an output of the input XOR circuitry.

9. The cryptographic architecture of claim 1, wherein, following performance of the cryptographic permutation by the cryptographic permutation circuitry, an output of the cryptographic permutation circuitry is copied to the permutation state register.

10. The cryptographic architecture of claim 1, wherein the one or more control registers comprise one or more of:
   an identifier register, writable by the at least one processing unit, to store an identifier of a cryptographic operation to be performed;
   a start register, writable by the at least one processing unit, to store a start flag for the cryptographic operation;
   a ready register, readable by the at least one processing unit, to store a ready flag indicating that the cryptographic architecture is ready to start another cryptographic operation;
   one or more round registers, writable by the at least one processing unit, to store one or more flags relating to rounds of cryptographic permutation; and
   an interrupt control register, writable by the at least one processing unit, to control interrupts to the at least one processing unit.

11. The cryptographic architecture of claim 1, wherein the cryptographic architecture is useable by the at least one processing unit to perform a cryptographic permutation for a SHA-3 function.

12. A method of performing a cryptographic operation comprising:
  receiving, at a cryptographic architecture, an instruction to perform the cryptographic operation from a processing unit, the processing unit being separate from the cryptographic architecture, the cryptographic architecture comprising a set of cryptographic registers comprising one or more control registers that are accessible to the at least one processing unit, wherein receiving said instruction comprises:
  accessing a control register of the cryptographic architecture to determine whether a start flag has been set by the processing unit to indicate a start of the cryptographic operation;
  loading, by a cryptographic permutation circuitry of the cryptographic architecture, a permutation state from a permutation state register;
  loading, by the cryptographic permutation circuitry, permutation input data from a permutation input register, the permutation input data being written under the control of the processing unit;
  loading, by the cryptographic permutation circuitry, mask input data from a mask input register;
  updating, by the cryptographic architecture, the permutation state in the permutation state register of the set of cryptographic registers by performing an XOR operation as a function of the permutation input data and a result of an AND operation performed on the mask input data and the permutation state to generate updated data;
  performing, using the cryptographic permutation circuitry, a cryptographic permutation on the updated data;
  storing, by the cryptographic architecture, an output of the cryptographic permutation into the permutation state register; and
  indicating, by the cryptographic architecture, to the at least one processing unit that the permutation is complete, wherein the processing unit accesses the output of the cryptographic permutation from the set of cryptographic registers, said indicating comprising setting a control flag within the control registers.

13. The method of claim 12, comprising:
  reading, by the processing unit, the output of the cryptographic permutation from the set of cryptographic registers.

14. The method of claim 12, comprising:
  loading, by the cryptographic permutation circuitry from a round control register, a round count;
  using, by the cryptographic permutation circuitry, the round count in the cryptographic permutation; and
  incrementing the round count in the round control register,
  wherein the loading, using and incrementing operations are repeated based on a comparison of the round control register and an end control register.

15. The cryptographic architecture of claim 1, wherein the set of cryptographic registers are memory mapped to the address space of the at least one processing unit.

* * * * *